(12) United States Patent  
Kobayashi

(10) Patent No.: US 9,154,504 B2  
(45) Date of Patent: Oct. 6, 2015

(54) DEVICE APPARATUS, CONTROL METHOD, AND RELATING STORAGE MEDIUM

(71) Applicant: CANON KABUSHIKI KAISHA, Tokyo (JP)

(72) Inventor: Makoto Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 54 days.

(21) Appl. No.: 14/076,486

(22) Filed: Nov. 11, 2013

(65) Prior Publication Data

US 2014/0137232 A1     May 15, 2014

(30) Foreign Application Priority Data

Nov. 14, 2012   (JP) ................................ 2012-250186

(51) Int. Cl.
*G06F 21/00*    (2013.01)
*H04L 29/06*    (2006.01)

(52) U.S. Cl.
CPC .............. *H04L 63/10* (2013.01); *H04L 63/083* (2013.01)

(58) Field of Classification Search
CPC ...................................................... H04L 63/10
See application file for complete search history.

(56) References Cited

U.S. PATENT DOCUMENTS

| | | | |
|---|---|---|---|
| 8,601,482 B2* | 12/2013 | Bussard et al. ............... | 718/104 |
| 2005/0081065 A1* | 4/2005 | Brickell et al. ............... | 713/202 |
| 2005/0138169 A1* | 6/2005 | Bahr .............................. | 709/224 |
| 2009/0064280 A1* | 3/2009 | Babeanu et al. .................. | 726/3 |
| 2009/0183250 A1* | 7/2009 | Harada .............................. | 726/9 |
| 2010/0281522 A1* | 11/2010 | Hatakeyama ..................... | 726/4 |
| 2013/0185784 A1* | 7/2013 | Tamura .............................. | 726/9 |

OTHER PUBLICATIONS

Hardt, "The OAuth 2. 0 Authorization Framework", Internet Engineering Task Force (IETF), Oct. 2012, pp. 1-22.

* cited by examiner

*Primary Examiner* — Morshed Mehedi
(74) *Attorney, Agent, or Firm* — Canon USA Inc. IP Division

(57) ABSTRACT

A device apparatus transmits a request for delegating authority, after it is delegated from a user, to an application, together with first authority information identified, to an approval server system, and acquires second authority information issued based on the first authority information from the approval server system.

9 Claims, 18 Drawing Sheets

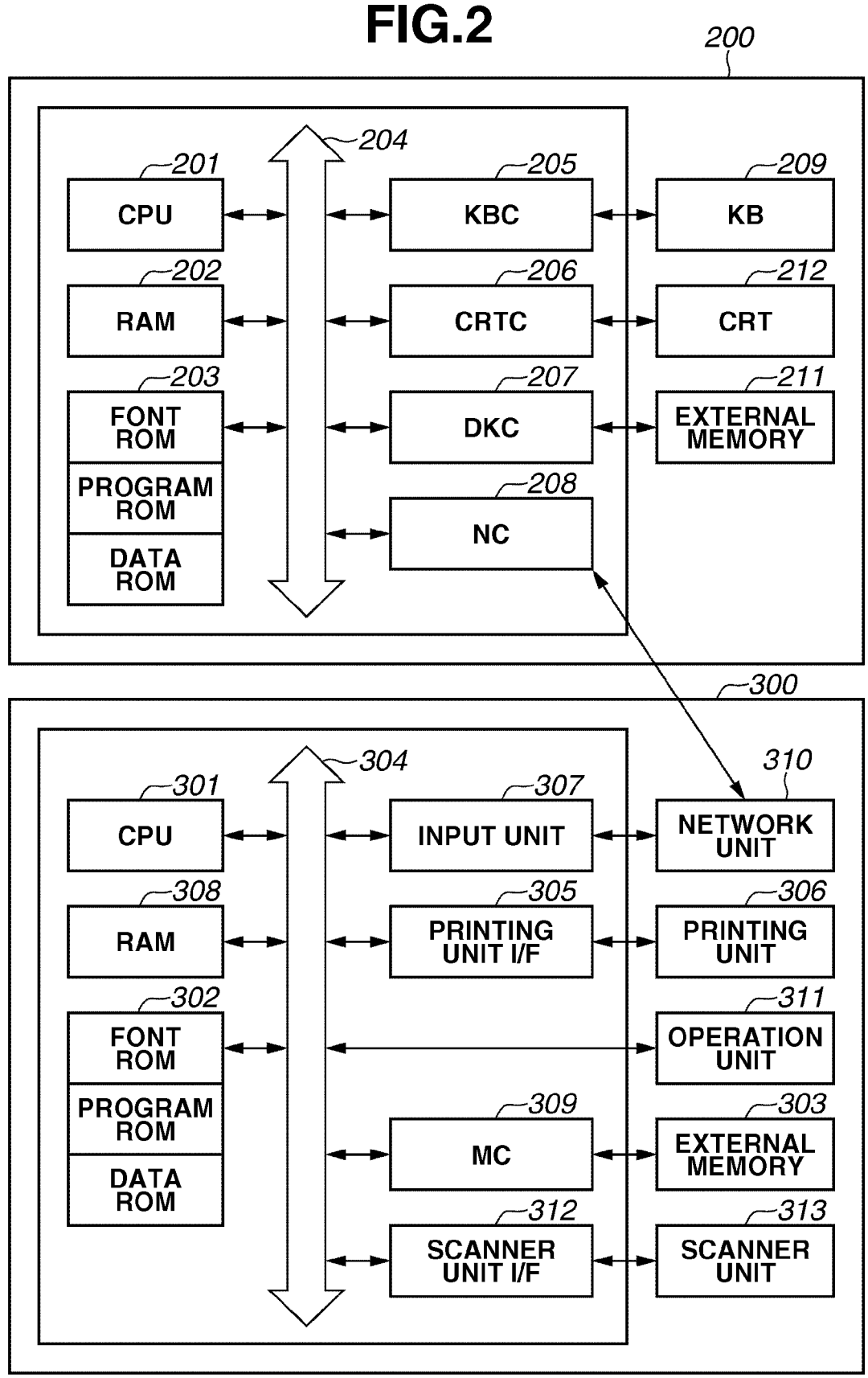

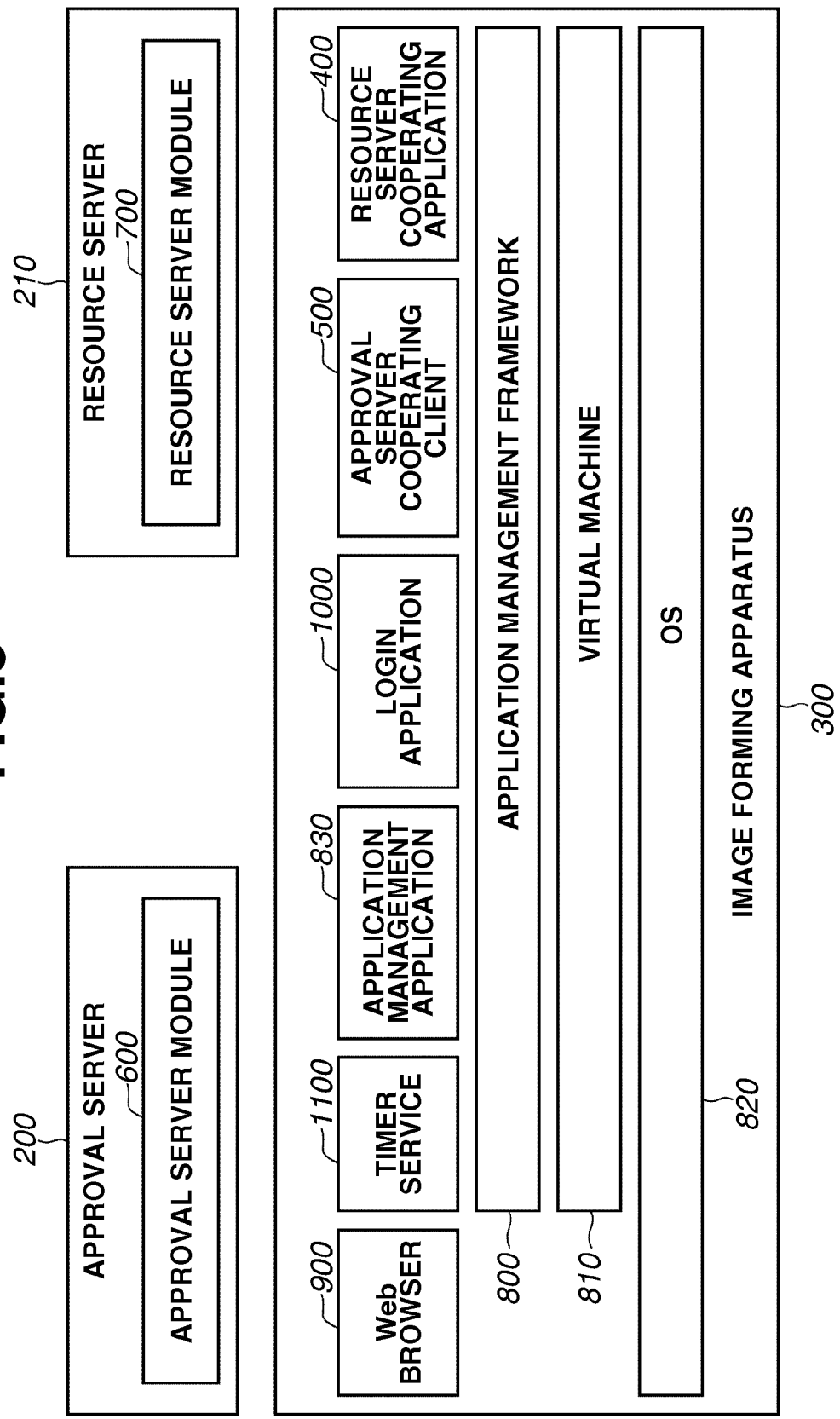

FIG. 4A

USER MANAGEMENT TABLE ~1200

| USER ID ~1201 | PASSWORD ~1202 | USER TYPE ~1203 |
|---|---|---|
| uid00000001 | ******** | USER |
| dev00000001 | ************** | CLIENT |
| uid00000002 | ******** | USER |

FIG. 4B

CLIENT MANAGEMENT TABLE ~1300

| CLIENT ID ~1301 | CLIENT NAME ~1302 | REDIRECT URL ~1303 | SERIAL NUMBER ~1304 |
|---|---|---|---|
| dev00000001 | ************** | https://dev01/redirect | #0000001 |

FIG. 4C

APPROVAL TOKEN MANAGEMENT TABLE ~1400

| APPROVAL TOKEN ID ~1401 | TOKEN TYPE ~1402 | TERM OF VALIDITY ~1403 | SCOPE ~1404 | REFRESH TOKEN ID ~1405 | TERM OF REFRESHMENT ~1406 | CLIENT ID ~1407 | USER ID ~1408 | APPLICATION ID ~1409 |
|---|---|---|---|---|---|---|---|---|
| AT_000000 | APPROVAL CODE | 2013/09/30 11:00.00 | RESOURCE A | | | dev00000001 | uid00000001 | |
| AT_000001 | PARENT TOKEN | 2013/09/30 12:00.00 | RESOURCE A | RT_000001 | 2014/09/30 12:00:00 | dev00000001 | uid00000001 | |
| AT_000002 | CHILD TOKEN | 2013/09/30 13:00.00 | RESOURCE A | | | dev00000001 | uid00000001 | app00000001 |
| AT_000003 | PARENT TOKEN | 2013/09/30 16:00.00 | RESOURCE A | RT_000002 | 2014/09/30 16:00:00 | dev00000001 | uid00000002 | |

FIG.5A

DEVICE USER MANAGEMENT TABLE (1500)

| USER ID (1501) | PASSWORD (1502) | IC CARD INFORMATION (1503) |
|---|---|---|
| user001 | ******** | ****** |
| user002 | ******** | ****** |
|  |  |  |

FIG.5B

DEVICE MANAGEMENT TABLE (1600)

| CLIENT ID (1601) | CLIENT SECRET (1602) | END-POINT URL (1603) | REDIRECT URL (1604) |
|---|---|---|---|
| dev00000001 | *************** | https://authz/oauth | https://dev01/redirect |

FIG.5C

PARENT TOKEN MANAGEMENT TABLE (1700)

| USER ID (1701) | APPROVAL TOKEN ID (1702) | REFRESH TOKEN ID (1703) |
|---|---|---|
| user001 | AT_000001 | RT_000001 |
| user002 | AT_000003 | RT_000002 |
|  |  |  |

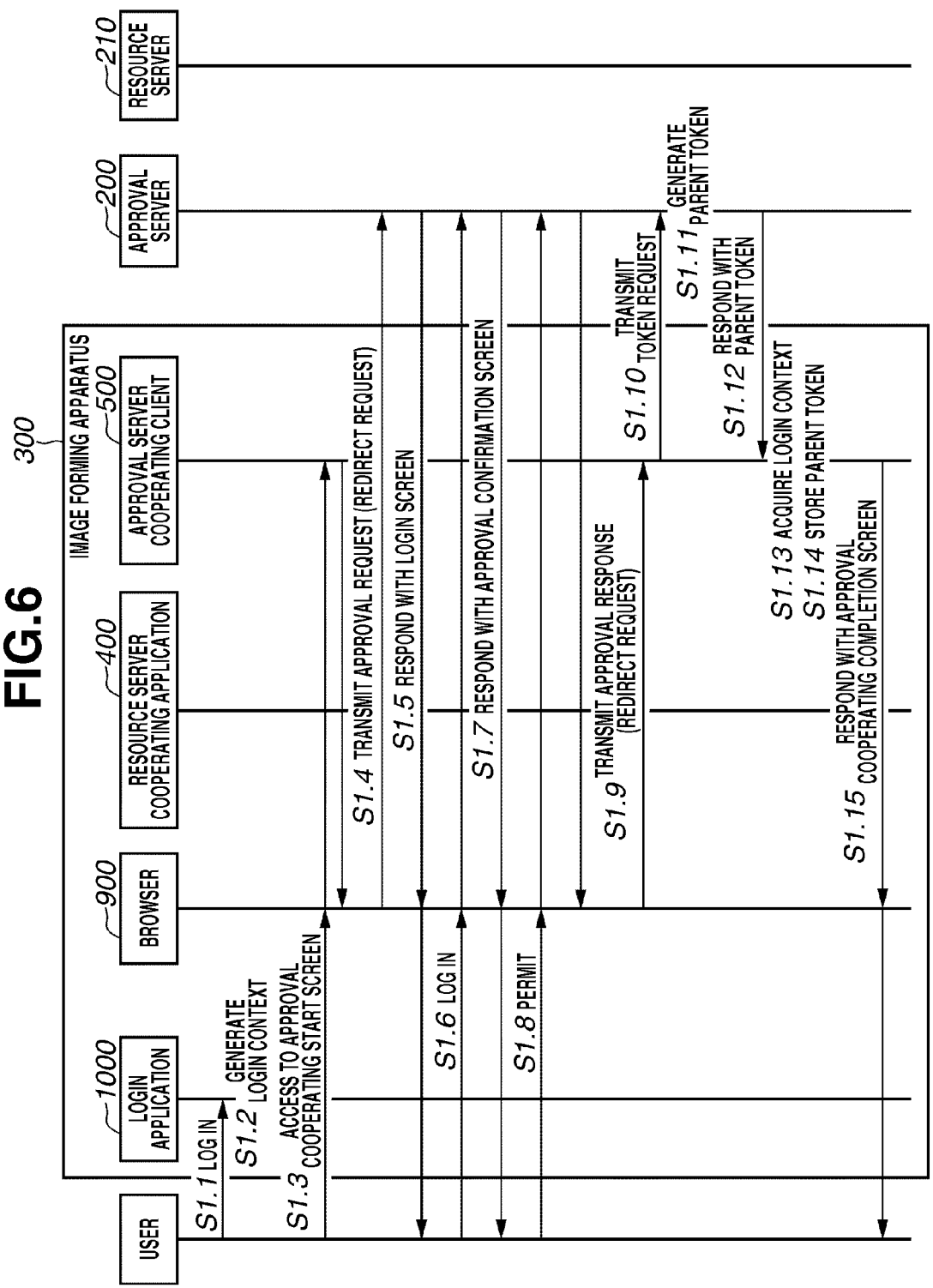

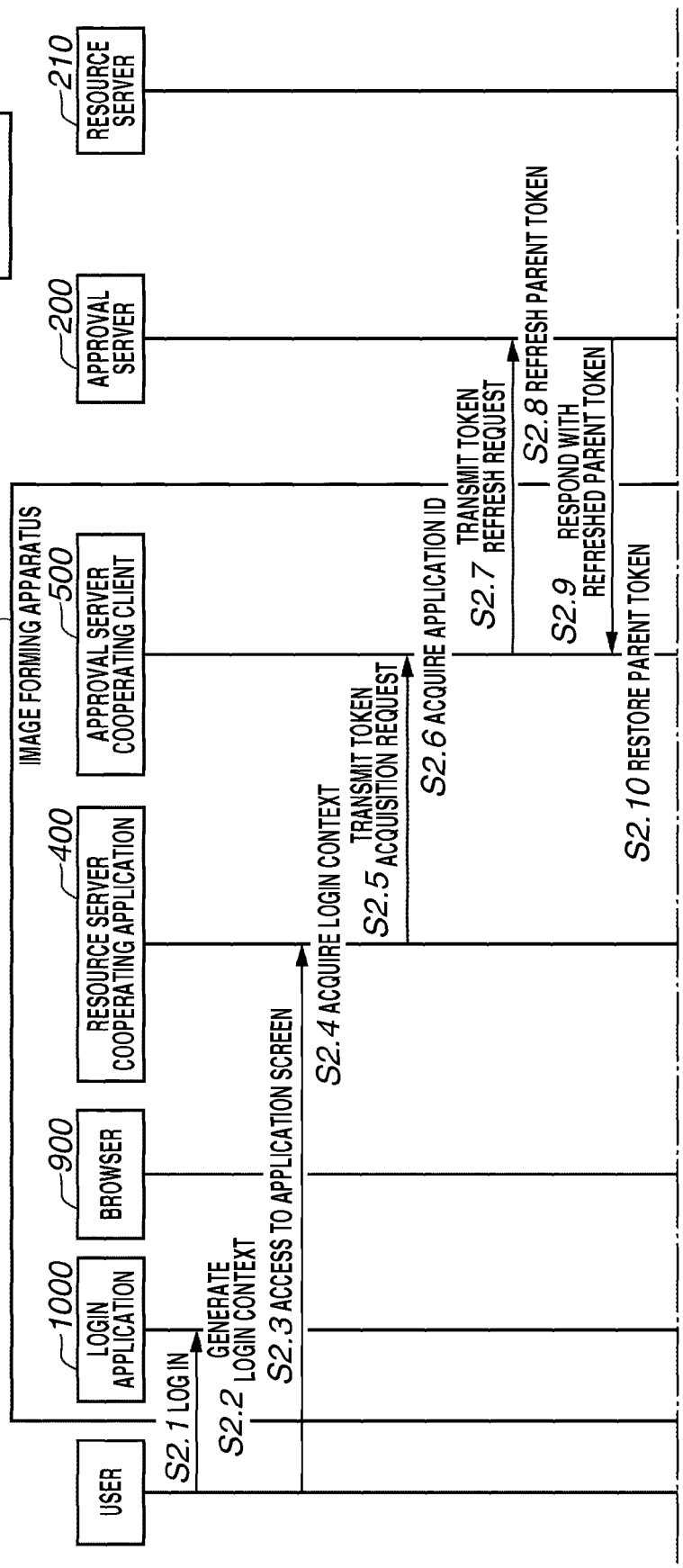

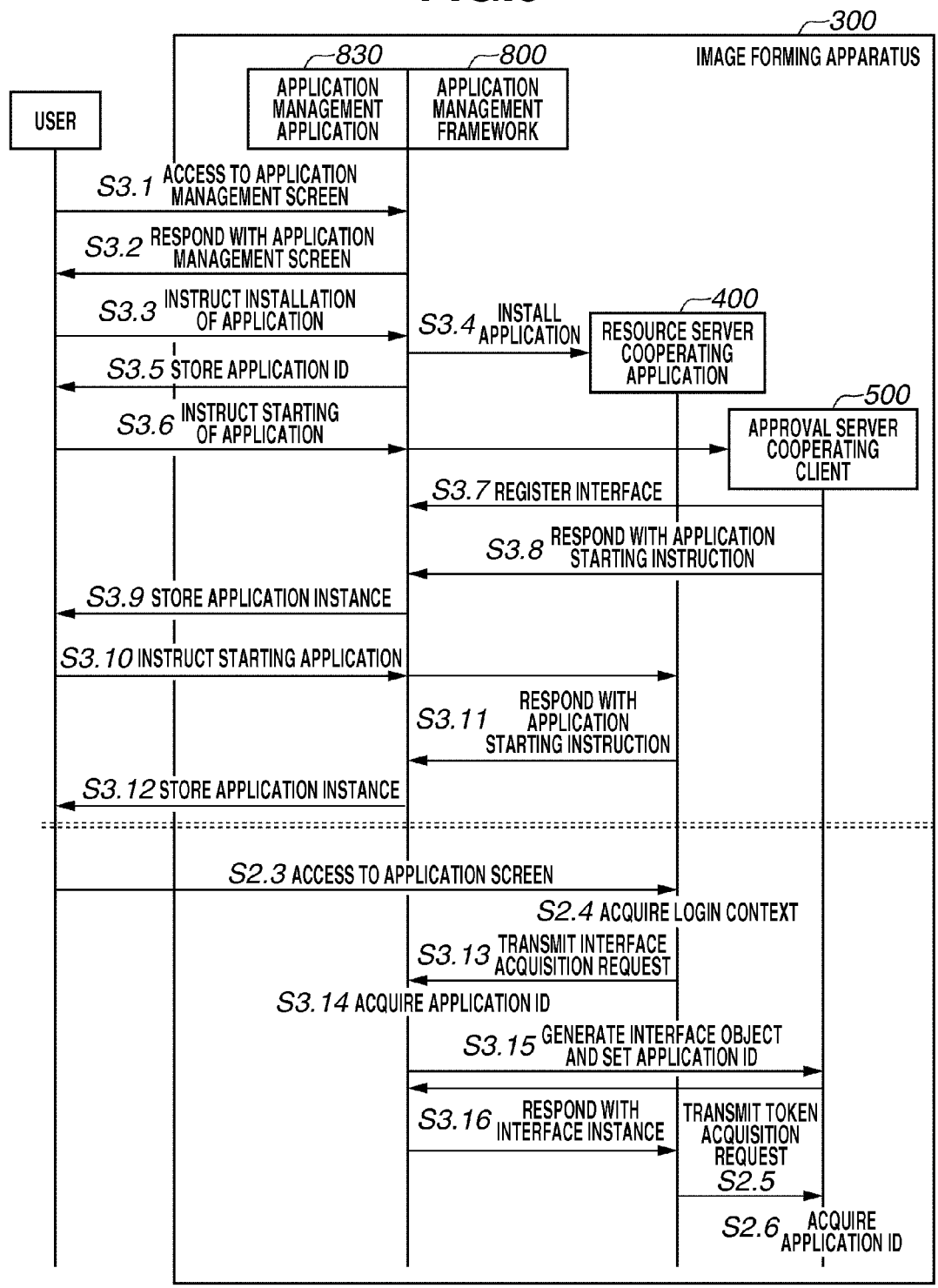

FIG.10A
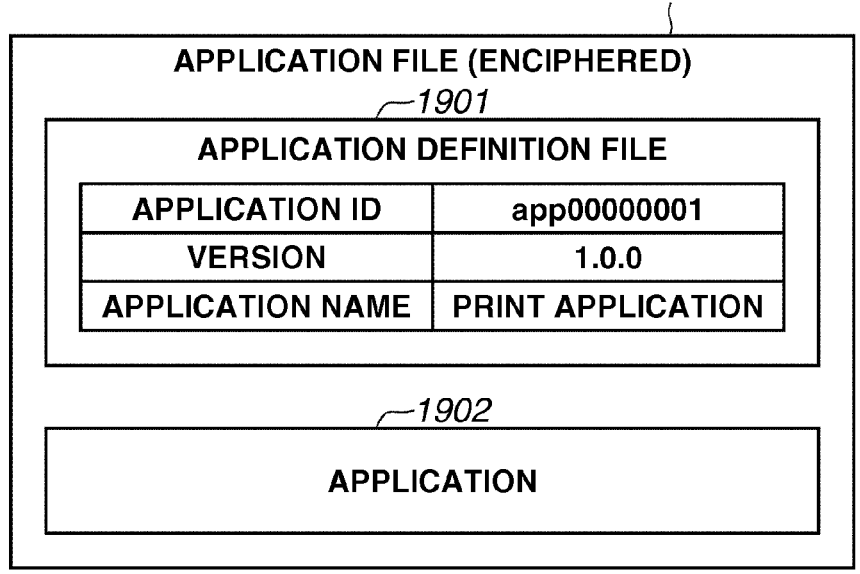
FIG.10B
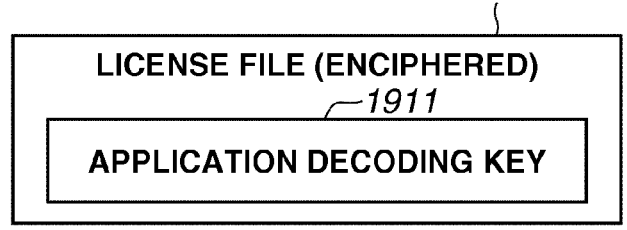
FIG.10C
| APPLICATION MANAGEMENT TABLE ||||| 1920 |
|---|---|---|---|---|
| APPLICATION ID 1921 | VERSION 1922 | APPLICATION NAME 1923 | STORAGE LOCATION 1924 | STATE 1925 |
| app00000001 | 1.0.0 | PRINT APPLICATION | ¥¥work¥app00000001 | INSTALLED |
| app00000002 | 1.0.0 | APPROVAL SERVER COOPERATING CLIENT | ¥¥work¥app00000002 | STARTED |
|  |  |  |  |  |

FIG.11A

TOKEN REQUEST MANAGEMENT TABLE ~1930

| APPLICATION ID ~1931 | STATE ID ~1932 |
|---|---|
| app00000001 | c1244fc0-0d8e-48dd-ae38-95a2b1fb32c2 |
| app00000001 | 3c1f4c37-6ac0-4e6c-b168-658dfca7ffdc |
| app00000002 | 7d296bbe-8055-4c3a-a65b-7acceb7f773f |
| | |

FIG.11B

DEVICE MANAGEMENT TABLE ~1600

| CLIENT ID ~1601 | CLIENT SECRET ~1602 | END-POINT URL ~1603 | REDIRECT URL ~1604 |
|---|---|---|---|
| dev00000001 | ************** | https://authz/oauth | https://dev01/redirect |

FIG.11C

PARENT TOKEN MANAGEMENT TABLE ~2700

| APPLICATION ID ~2701 | CLOUD USER ID ~2702 | APPROVAL TOKEN ID ~2703 | REFRESH TOKEN ID ~2704 | STATE ID ~2705 |
|---|---|---|---|---|
| app001 | C_user001 | AT_000001 | RT_000001 | c1244fc0-0d8e-48dd-ae38-95a2b1fb32c2 |
| app002 | C_user002 | AT_000003 | RT_000002 | 7d296bbe-8055-4c3a-a65b-7acceb7f773f |
| | | | | |

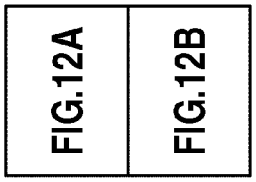
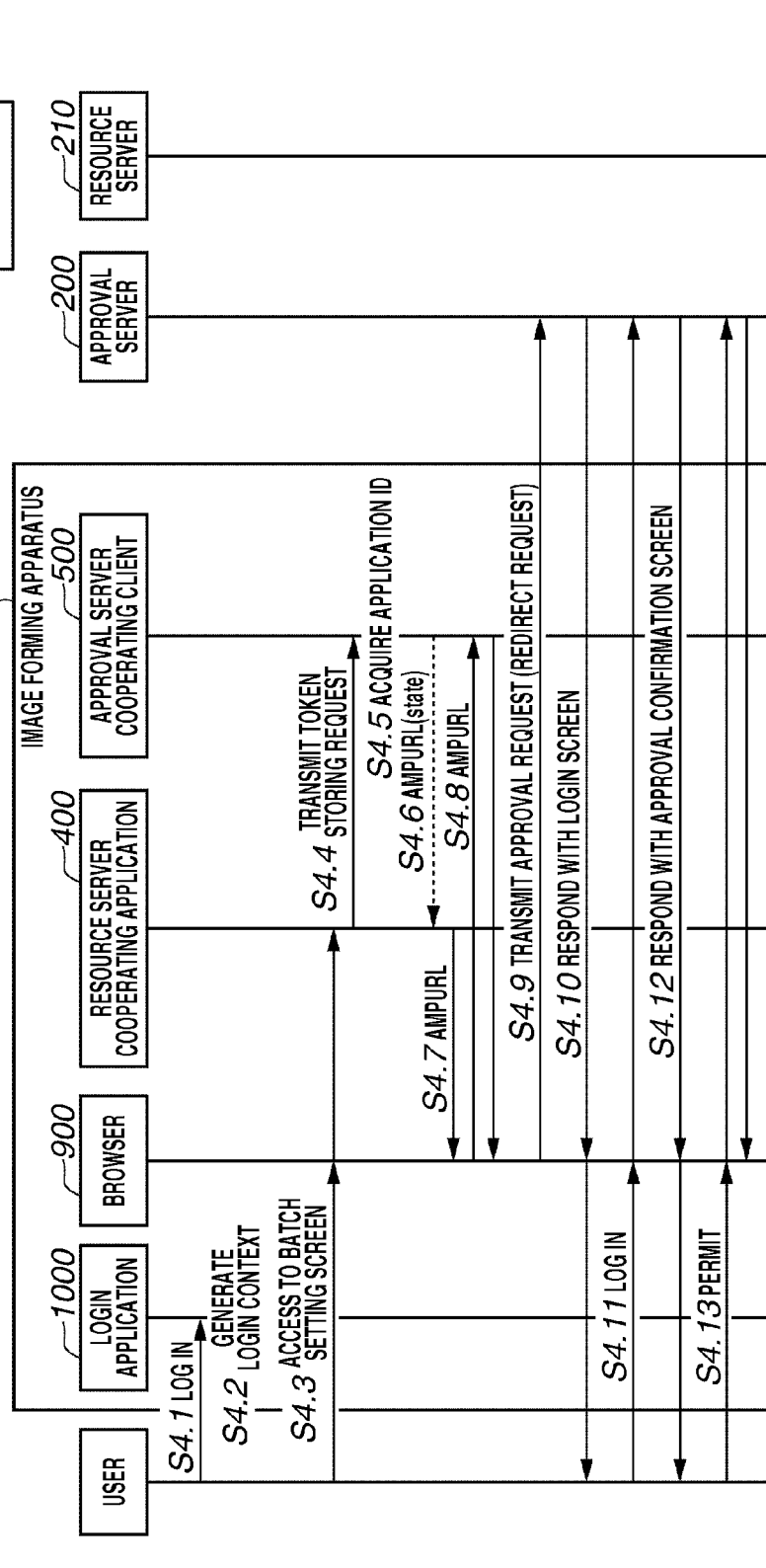

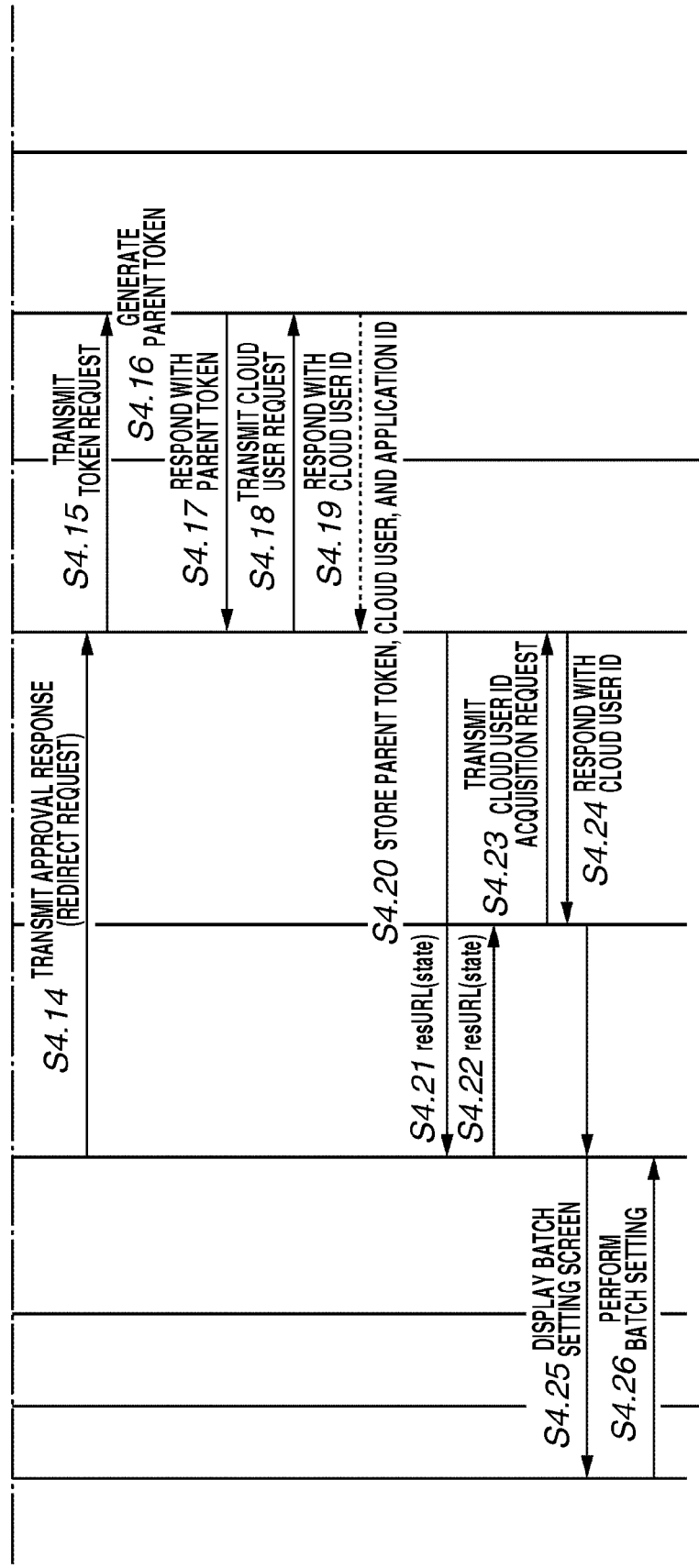

FIG.13A

BATCH SETTING

FIG.13B

| BATCH SETTING |
|---|

User01

TIME  8:30

TIME  12:00

SETTING

FIG.15

| APPLICATION ID | TIMER NOTIFICATION TIME |
|---|---|
| app001 | 8:30 |
| app001 | 12:00 |
|  |  |

TIMER SETTING TIME MANAGEMENT TABLE

| BATCH EXECUTION TIME MANAGEMENT TABLE ||
|---|---|
| *4001* | *4002* |
| CLOUD USER ID | BATCH EXECUTION TIME |
| C_user001 | 8:30 |
| C_user002 | 12:00 |
|  |  |

DEVICE APPARATUS, CONTROL METHOD, AND RELATING STORAGE MEDIUM

BACKGROUND

1. Field

Aspects of the present invention generally relate to a device apparatus that is operable in response to delegation of authority from a user, a method for controlling the device apparatus, and a related storage medium.

2. Description of the Related Art

In general, a widely recognized on-line server can provide various types of services, including a service that is usable to create a PDF electronic document and a service that is usable to store the created electronic document, to a terminal via the internet. More specifically, each user can generate an electronic document by using an on-line service that is available via the terminal, when the terminal does not have any function of generating such an electronic document. Further, each user can use an on-line service to store personal electronic document data that exceeds the maximum storage capacity of the terminal.

Further, due to development of cloud systems, there is an increasing opportunity of creating new values obtainable by causing a plurality of services to cooperate with each other. For example, as an example cooperation of two services, when a PDF electronic document is generated using one service, the generated document can be directly stored in another service without requiring any operation by the terminal. On the other hand, the following problems may occur when a plurality of services cooperate with each other.

In short, the risk of leaking user data and personal information increases significantly if a great amount of information is transmitted and received between two or more services beyond user intention. When two or more services cooperate with each other, it is desired that a service can acquire user data and personal information only when the service can provide a result responding to user's request. On the other hand, for a service provider, employing an easily installable mechanism for the cooperation of services is desired.

OAuth protocol provides a standard way to realize approval cooperation considering the above-mentioned situation. For example, among a plurality of services having installed OAuth, accessing a service A without using any user authentication information is feasible for a third-party service B if a specific authority is given to the third-party service B from a user. In this case, it is necessary for the service A to inform the user of explicit contents of authority (e.g., data to be accessed by the third-party service B and a usable range of the service) before it gives user approval to the access from the third-party service B. The conduct performed by a user to give explicit approval via an approval screen is referred to as "approval operation."

If the user performs the approval operation, the service A gives specific authority approved by the user to the third-party service B. Then, the third-party service B directly or indirectly receives an approval token from the service A. The approval token is proof of recognizing the access from the service B based on the approved authority. Subsequently, the third-party service B can access the service A using the approval token.

A sequential processing flow for causing the entity that uses the service (e.g., the third-party service B according to the above-mentioned example) to store the approval token (i.e., the result of the approval operation performed by the user) can be referred to as user operation for delegating authority to the third-party service B.

As mentioned above, an entity that provides a usable service gives actual authority to an entity that uses the service. According to the above-mentioned example, the service A gives authority to the service B after confirming the approval operation performed by the user.

The above-mentioned technique is not limited to the cooperation between services. It is conventionally known that an application installed on a terminal that a user operates can cooperate with a service accessible via the internet using OAuth. For example, when a plurality of applications is installed on a smartphone (i.e., a communication tool having the capability of adding and deleting applications), each application can cooperate with an external service accessible via the internet. As a representative example, an application installed on a smartphone can cooperate with an on-line service, which is generally referred to as social networking service (SNS), using OAuth.

In this case, the application installed on the smartphone accesses the SNS on behalf of a user. The authority delegated to the application is limited to minimum functionality necessary to use the SNS (e.g., the authority required to post a message). The application can cooperate with the SNS with appropriate authority without storing SNS authentication information in the smartphone.

After user authority is delegated to an application, if the application uses a cloud service in a state where a user does not log in a device, it is generally difficult to identify an authority to be used.

SUMMARY

According to an aspect of the present invention, a device apparatus communicates via a network with a server system that provides a service to an external apparatus and an approval server system and installs an application that uses the service. More specifically, the device apparatus includes a first acquisition unit configured to acquire first authority information to be issued by the approval server system in response to an approval operation that permits delegating user authority required to use the service to the device apparatus, a receiving unit configured to receive identification information required to identify a user who uses the service from the application that starts batch processing at a predetermined time having been set beforehand, an identifying unit configured to identify the first authority information based on the received identification information, and a second acquisition unit configured to transmit a request to delegate authority, if it is delegated from the user, to the application, together with the identified first authority information, to the approval server system and acquire second authority information, which has been issued based on the first authority information, from the approval server system.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates a hardware configuration of each apparatus.

FIG. 3 illustrates a software module configuration of each apparatus.

FIGS. 4A, 4B, and 4C illustrate tables that can be managed by an approval server.

FIGS. 5A, 5B, and 5C are tables that can be managed by an image forming apparatus.

FIG. 6 is a diagram illustrating a parent token issuance sequence.

FIG. 9 is a diagram illustrating an application management sequence.

FIGS. 10A, 10B, and 10C illustrate an application file configuration, a license file configuration, and an application management table.

FIGS. 11A, 11B, and 11C illustrate token management tables.

FIG. 12 is a diagram illustrating a batch processing setting sequence.

FIGS. 13A and 13B illustrate batch setting screens.

FIG. 15 illustrates a timer service setting time management table.

FIG. 16 illustrates a batch execution time management table.

DESCRIPTION OF THE EMBODIMENTS

Figure 1:
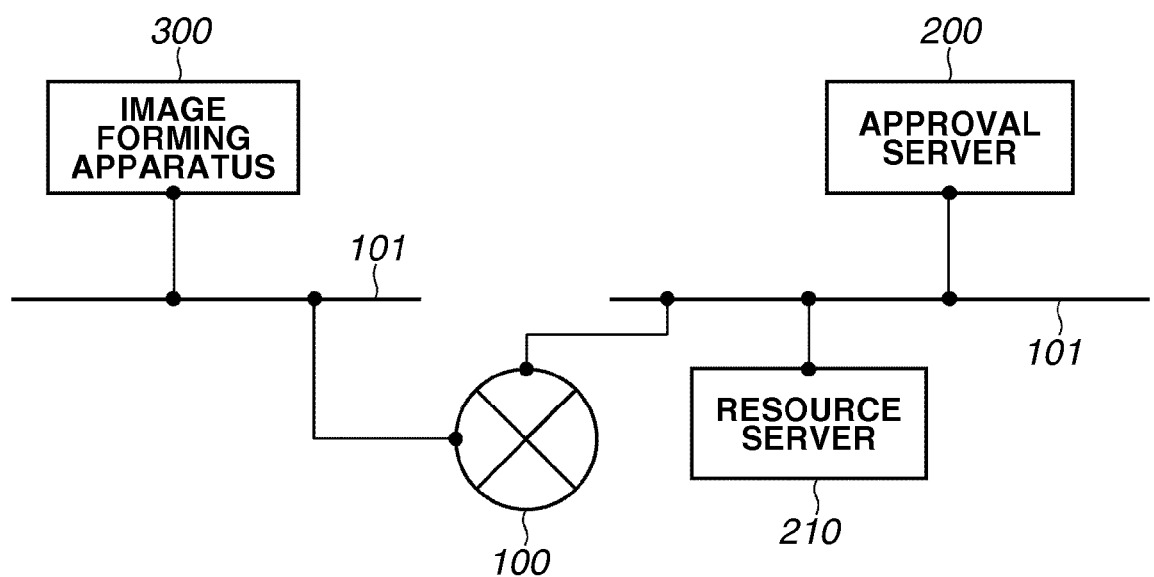
FIG. 1 illustrates a system configuration.

Various exemplary embodiments will be described in detail below with reference to the drawings.

In an exemplary embodiment, an internet server can provide an on-line business form service that is usable to generate business form data via the internet and an on-line printing service that is usable to print data acquired via the internet. Hereinafter, the business form service and the printing service (i.e., functionalities that are available via a network for each device apparatus) are collectively referred to as resource services.

The device apparatus according to an exemplary embodiment is an image forming apparatus (i.e., a terminal). A print application and a business form application installed on the image forming apparatus can use resource services. Hereinafter, the print application and the business form application (i.e., applications that use the resource services) are referred to as resource service cooperating applications.

Further, a system according to an exemplary embodiment performs authority delegation processing using an authorization framework of OAuth. According to OAuth, a data format referred to as "token" is employed to express information that identifies the range of an authority delegated by a user. The entity that possesses any available service (i.e., a server that provides a resource service) permits an access from a third party within an authority range identified based on the token.

In the present exemplary embodiment, the above-mentioned token or any other information to be referred to in identifying the range of authority is referred to as "authority information." Further, the information defining the range of authority to be delegated to the entity that uses a service (i.e., the image forming apparatus) or the resource service cooperating application is referred to as a scope. Further, a token to be issued in a case where a user delegates authority to the image forming apparatus is referred to as a parent token. An example of a characteristic feature of the present exemplary embodiment is delegating user authority to a device apparatus (e.g., the image forming apparatus).

For example, it is now presumed that the print application and the business form application are already installed on an image forming apparatus. According to a conventional technique, it is necessary for a user to perform an approval operation on the print application when the user uses a resource service via the print application and on the business form application when the user uses a resource service via the business form application.

However, it is convenient for each user if only one approval operation is required when the user uses various resource services via respective applications in a situation that the user is operating the same image forming apparatus. Therefore, to reduce the number of required user approval operations, it is useful that the image forming apparatus delegates authority to the application on behalf of the user. It means that the user implicitly approves that the authority has been delegated to the application at the time when the user has delegated authority to the image forming apparatus.

In the present exemplary embodiment, each user is required to perform an approval operation when the user delegates authority to the image forming apparatus. However, the user is not required to perform an approval operation when the authority is delegated to the application. As described above, delegating user authority to a device apparatus is useful to reduce the number of required user approval operations. It becomes easy to delegate authority to each application to be added later.

An example method for delegating authority to an application is described in detail below. For example, it may be useful that the method includes enabling a plurality of applications to share the same parent token if it is acquired by the image forming apparatus. However, from the viewpoint of security, it is not desired to give the same authority to all applications.

For example, the print application does not require any authority for business form generation although it requires printing authority. On the other hand, the business form application does not require any printing authority although it requires the authority for business form generation. When respective applications are mutually different in their purposes, respective applications require mutually different authorities. Therefore, to enhance the security, it is desired to give a minimum required authority to each of respective applications.

Further, even when a token management server accepts an access from an unexpected application, it may be desired to store a record of the application having accessed. The recorded information can be effectively used in determining a strategy for enhancing the functionality of the resource service. For example, an application that has been frequently used can be identified based on the recorded information. The functionality of the application can be expanded depending on its usage scene.

Further, it is necessary for a resource service server to check whether a resource service cooperating application is an authorized application when it accesses the server with a token, otherwise the service of the server will be freely used by an unauthorized application.

Further, in a case where a device does not have any user management function, it is difficult for a plurality of users to make a reservation for causing the same device to perform batch processing of applications. On the other hand, in a case where a device has the capability of managing user information, uniquely using the device is feasible by managing a cloud access token in association with a user name of the device. However, when a device user is not present, it is difficult to identify an approval token to be used among a plurality of approval tokens.

The batch processing of applications includes accessing a cloud service on behalf of a user who does not log in the device. Therefore, in a case where a plurality of applications or a plurality of users can share the same approval token, a spoof of application or a spoof of user may occur in a state where no user is present.

In an exemplary embodiment, each resource service cooperating application does not directly use a parent token. Instead, the resource service cooperating application delegates only a necessary portion of authorities delegated to a device to an application. Further, the token management server performs delegation of authority to the application in such a way that the application can be identified explicitly. A token to be issued when the image forming apparatus redelegates authority to the resource service cooperating application is referred to as "child token." An operation necessary to issue both the parent token and the child token is referred to as "approval cooperation."

In a first exemplary embodiment, a print application is installed on an image forming apparatus. The print application can perform printing operations using resource services, as described in detail below. The first printing operation is an independent operation that can be started by the print application when a user logs in the image forming apparatus. The second printing operation is a batch operation that can be started by the same print application at time having been set beforehand without requiring any login operation by a user.

In the present exemplary embodiment, the same print application is operable differently as mentioned above depending on the state of launching of the print application. More specifically, a user may launch the application after the user logs in the image forming apparatus. On the other hand, a timer service is usable to start batch processing of the application at the time having been set beforehand. Although a single print application performs two operations as described in the present exemplary embodiment, it is useful that two print applications having the above-mentioned functions are installed on the same image forming apparatus.

A delegation-of-authority system according to the present exemplary embodiment can be realized as an on-line system having a configuration illustrated in FIG. 1. A wide area network (WAN) 100 constitutes a World Wide Web (WWW) system. Constituent components are mutually connected via a local area network (LAN) 101.

An approval server 200, which can realize OAuth, includes an approval service module. A resource server 210 can provide a single or a plurality of resource services (e.g., the printing service and the business form service) having been set up beforehand. An image forming apparatus 300 includes a single or a plurality of resource service cooperating applications that have been installed beforehand. Each resource service cooperating application enables a user to use an intended resource service. The approval server 200, the resource server 210, and the image forming apparatus 300 are mutually connected via the WAN 100 and the LAN 101. The approval server 200, the resource server 210, and the image forming apparatus 300 can be connected to the same LAN or different LANs. Further, the approval server 200 and the resource server 210 can be united as a single server.

Further, it is useful to configure the approval server 200 as a server group including a plurality of approval servers and configure the resource server 210 as a server group including a plurality of resource servers. In general, an approval server system is constituted by a single server that includes an approval service module or a group of servers. In other words, the approval server system is a server group that does not include any resource server or any image forming apparatus. Similarly, a resource server system is constituted by a single server that includes a resource service module or a plurality of servers. When the server system includes a plurality of servers, it is useful to divide the module of the server system into a plurality of partial modules to be allocated to respective servers, so that the partial modules of the servers can cooperatively perform each functional operation.

The delegation-of-authority system according to the present exemplary embodiment can be realized as a system, which includes a server and an image forming apparatus illustrated in FIG. 2. In FIG. 2, an approval server 200 and an image forming apparatus 300 are mutually connected via the WAN 100 and the LAN 101 to communicate with each other. The approval server 200 has the following configuration. The hardware block diagram illustrated in FIG. 2 corresponds to a hardware block diagram for a general information processing apparatus. A hardware configuration of a general information processing apparatus is applicable to the approval server 200 according to the present exemplary embodiment. Further, the resource server 210 has a configuration similar to that of the approval server 200.

In FIG. 2, a central processing unit (CPU) 201 can execute an operating system (OS) or an application program, which are stored in a program ROM of a read only memory (ROM) 203 or loaded into a random access memory (RAM) 202 from an external memory 211, such as a hard disk (HD). The CPU 201 can control each block connected to a system bus 204. The OS is an essential component of system software running on a computer. Processing of each sequence described below can be realized by executing the OS. The RAM 202 is functionally operable as a main memory or a work area for the CPU 201.

A keyboard controller (KBC) 205 can control key information input via a keyboard 209 or a pointing device (not illustrated). A cathode ray tube controller (CRTC) 206 can control a CRT display device 212. A disk controller (DKC) 207 can control data access for the external memory 211, such as the hard disk (HD), which stores various data. A network controller (NC) 208 can perform communication control processing for the image forming apparatus 300 or other device connected via the WAN 100 or via the LAN 101. In the following description, unless otherwise specifically mentioned, the CPU 201 plays an important role as an essential hardware component of the approval server 200. The application program installed on the external memory 211 plays an important role as an essential software component of the approval server 200.

The image forming apparatus 300 has the following configuration. As illustrated in the drawing, the image forming apparatuses 300 includes a CPU 301. The CPU 301 can control each block connected to a system bus 304 based on a control program stored in a ROM 302 or an external memory 303. An image signal generated through the processing of the CPU 301 can be output as output information, via a printing unit I/F 305, to a printing unit (i.e., image forming apparatus engine) 306. Further, the CPU 301 can communicate with the approval server 200 via an input unit 307 and a network unit 310. The image forming apparatus 300 can notify the approval server 200 of internal information thereof. Further, the image forming apparatus 300 can include an image processing unit, such as a scanner unit 313.

A program ROM of the ROM 302 stores the control program for the CPU 301. A font ROM of the ROM 302 stores font data usable in generating output information. A data ROM of the ROM 302 stores information to be transmitted to or received from the approval server 200 in a case where the external memory 303 (e.g., a hard disk) is not provided in the image forming apparatus. A RAM 308 is functionally operable as a main memory or a work area for the CPU 301. A memory capacity of the RAM 308 is expandable when an optional RAM is connected to an extension port (not illustrated). Further, the RAM 308 is usable as an output information rasterizing area, an environment data storing area, or NVRAM.

A memory controller (MC) 309 can control any access to the external memory 303. The external memory 303 is an optionally connected memory, which stores font data, emulation program, and form data. An operation unit 311 includes various switches and a light-emitting diode (LED) display device to enable a user to operate the image forming apparatus 300. In the following description, unless otherwise specifically mentioned, the CPU 301 plays an important role as an essential hardware component of the image forming apparatus 300. The application program installed on the external memory 303 plays an important role as an essential software component.

FIG. 3 illustrates a module configuration of the approval server 200, the resource server 210, and the image forming apparatus 300 according to the present exemplary embodiment. The approval server 200, the resource server 210, and the image forming apparatus 300 illustrated in FIG. 3 are similar to those illustrated in FIG. 2. The approval server 200 includes an approval server module 600. The approval server module 600 includes a user identification unit 601, a client verification unit 602, a parent token issuing unit 603, a child token issuing unit 611, and a child token verifying unit 620. The resource server 210 includes a resource server module 700. The resource server module 700 includes a child token authority confirming unit 701 and a resource request processing unit 702.

In the image forming apparatus 300, the CPU 301 executes an OS 820 stored in the ROM 302 or the external memory 303 to control each application. In general, the OS 820 is a real-time OS or a general OS, which is represented by Linux (registered trademark). A virtual machine 810 is, for example, Java (registered trademark) VM that is widely known. The virtual machine 810 is a virtual application execution environment that is operable as an application that can be controlled by the OS.

An application management framework 800 has a function of managing the life cycle of an application (i.e., a target to be managed) that operates in the application execution environment that can be provided by the virtual machine 810. Further, the application management framework 800 has an I/F providing function of mediating a processing request between its control I/F and each application. The life cycle indicates the state of each application, including installation, launching, stoppage, and uninstallation of the application. The application management framework 800 according to the present exemplary embodiment is Open Services Gateway initiative (OSGi) (registered trademark) defined by the OSGi Alliance.

Further, the approval server cooperating client 500, one or a plurality of resource server cooperating applications 400, and a login application 1000 are various applications that can operate in the application execution environment provided by the virtual machine 810. The application management framework 800 manages the life cycle of each application. The application management framework 800 manages each application based on a definition value described in an application definition file. For example, the application management framework 800 associates application ID uniquely allocated to each application with an actual state of the application installed or started for management of these applications. An application management application 830 enables a user to install various applications and input a start request via the life cycle management control I/F provided by the application management framework 800.

The approval server cooperating client 500 according to the present exemplary embodiment includes a print application, a business form application, a FAX application, and a scanning application. Each application can acquire a resource necessary to execute the application from the resource server by accessing the resource server using an access token described below in the present exemplary embodiment.

The resource is a list of printable documents when the resource server 210 is a printing service. The print application can cooperate with the printing service to acquire a printable document (i.e., a resource of the printing service). The print application has a function of downloading a document described in the list from the resource server, after completing the acquisition of the printable document list, and printing the downloaded document. As an example implementation of the above-mentioned function, a user logs in the image forming apparatus 300 and launches the application. As another example implementation, a user may designate execution time beforehand to start the above-mentioned processing automatically.

In the latter case, if the designated time has come, a timer service (described in detail below) issues an event notification. In response to the event notification, the print application launches processing. Executing an application in response to an event notification from the timer service is referred to as "batch execution." The batch execution is not the processing to be executed according to an instruction of a user. The batch execution is the processing to be started at the designated time having been set by a user or at the designated time having been set beforehand.

Similar to the description about the printing service, in a case where the approval server cooperating client 500 is a business form service, the business form application has a function of acquiring a list of business forms that can be generated by the resource server, acquiring a business form from the list, and printing the acquired business form. Similar to the description about the printing service, in a case where the approval server cooperating client 500 is a FAX service, the FAX application has a function of acquiring a list of FAX documents that can be FAX transmitted from the resource server, acquiring a FAX document from the list together with a FAX number, and FAX transmitting the acquired FAX document. Similar to the print application, each of the business form application and the FAX application can be started in response to an instruction from a user after the user logs in the image forming apparatus 300 or can be performed as above-mentioned batch execution.

A timer service 1100 is one of applications that can operate on the application management framework 800. The timer service 1100 has a function of notifying various applications operating on the application management framework 800 of a timer event. Various applications can access a timer setting interface of the timer service 1100. For example, the resource server cooperating application 400 uses the timer setting interface to set event notification time for the timer service. The timer service 1100 can store ID information and timer setting time of an application (i.e., a timer event notification target).

When the timer setting time has come, the timer service 1100 notifies the application corresponding to the application ID of the timer event. If the application receives the timer event notification, the application automatically starts an application operation. For example, when the timer service 1100 performs timer event notification setting, the batch execution can be performed at a setting time even when an explicit operational instruction (e.g., user operation) for the application is not performed.

In the present exemplary embodiment, the approval server cooperating client 500, the resource server cooperating application 400, and the login application 1000 can be provided beforehand in the image forming apparatus 300. Alternatively, the approval server cooperating client 500, the resource server cooperating application 400, and the login application 1000 can be installed later via the application management application 830 and the application management framework 800. Further, the image forming apparatus 300 includes a web browser 900, which is a user agent using WWW. An example sequence for installing and starting an application, which can be performed by the application management framework 800, is described in detail below.

FIGS. 4A, 4B, and 4C illustrate data tables that the approval server 200 can store in the external memory 211. The data tables illustrated in FIGS. 4A, 4B, and 4C can be stored in another server that is accessible via the LAN 101, not in the external memory 211 of the approval server 200. FIG. 4A illustrates a user management table 1200. The user management table 1200 includes information about user ID 1201, password 1202, and user type 1203. The approval server 200 is functionally operable as a user (or client) authentication unit configured to verify a data combination of the user ID 1201 and the password 1202 and generate authentication information, if the data combination is correct.

FIG. 4B illustrates a client management table 1300. The client management table 1300 includes information about client ID 1301, client name 1302, redirect URL 1303, and serial number 1304. The client ID 1301 is associated with the user ID 1201 of the user management table 1200, so that they are mutually referable. The client name 1302 and the redirect URL 1303 are values usable in the sequence of OAuth. The serial number 1304 is a value to be registered when the client is the image forming apparatus 300, and is a value unique identifying the image forming apparatus.

FIG. 4C illustrates an approval token management table 1400. The approval token management table 1400 includes information about approval token ID 1401, token type 1402, term of validity 1403, scope 1404, refresh token ID 1405, term of refreshment 1406, client ID 1407, user ID 1408, and application ID 1409. Example processing relating to the approval token management table 1400 is described in detail below.

FIGS. 5A, 5B, and 5C are data tables that the image forming apparatus 300 can store in the external memory 303. FIG. 5A illustrates a device user management table 1500. The login application 1000 can refer to or update the device user management table 1500. Further, in the present exemplary embodiment, it is feasible to store the device user management table 1500 in another server that the image forming apparatus 300 can access via the LAN 101, instead of storing the device user management table 1500 in the external memory 303 of the image forming apparatus 300.

The device user management table 1500 includes information about user ID 1501, password 1502, and IC card information 1503. The login application 1000 can use an input screen of the image forming apparatus 300 as a screen (not illustrated) that receives information about user ID and password from a user. Then, the login application 1000 verifies whether an input pair of user ID and password coincides with any combination of the user ID 1501 and the password 1502. If coincidence between the compared information is confirmed, the login application 1000 authenticates each user by generating a login context including information about the user ID 1501.

Further, the login application 1000 can acquire IC card information from an IC card reader (not illustrated) connected to the image forming apparatus 300. Then, the login application 1000 verifies whether the acquired IC card information coincides with the IC card information 1503 of the device user management table 1500. If coincidence between the compared information is confirmed, the login application 1000 authenticates each user by generating a login context including information about corresponding user ID 1501.

The login context is an object for which information about user ID 1501 of an authenticated user is set. If desired, it is useful to constitute the login context in such a way as to set additional information (e.g., user attribute information including user's domain or user's electronic mail address). The image forming apparatus 300 stores the login context while a user logs on the image forming apparatus 300. When an internal program module uses a resource of the image forming apparatus 300, the internal program module uses the login context in accessing to a secure.

FIG. 5B illustrates a device management table 1600. The approval server cooperating client 500 can refer to or update the device management table 1600. The resource service cooperating application 400 can refer to the device management table 1600. The device management table 1600 includes information about client ID 1601, client secret 1602, end-point URL 1603, and redirect URL 1604. The client ID 1601 and the client secret 1602 correspond to the user ID 1201 and the password 1202, which have been issued and stored beforehand by the approval server 200.

Further, data similar to the information registered together with the client ID 1301, the client name 1302, and the serial number 1304 of the image forming apparatus 300 in the client management table of the approval server 200 is stored in the redirect URL 1604. For example, an on-line registering method is usable for the image forming apparatus 300 to register the above-mentioned information via the LAN 101 and the WAN 100. Alternatively, a user can set respective values via the approval server 200 or the image forming apparatus 300. In the present exemplary embodiment, the end-point URL 1603 is URL of an end-point to be used for OAuth provided by the approval server 200.

FIG. 5C illustrates a parent token management table 1700. Only the approval server cooperating client 500 can refer to or update the parent token management table 1700. The parent token management table 1700 includes information about user ID 1701, approval token ID 1702, and refresh token ID 1703. Example processing relating to the parent token management table 1700 is described in detail below.

A sequence relating to parent token acquisition according to the present exemplary embodiment is described in detail below with reference to FIG. 6 and FIGS. 7A to 7C. The parent token acquisition sequence is an operation to be performed only one time when a user initially uses the image forming apparatus 300. For example, it is desired to perform processing illustrated in FIG. 6 when the user initially uses the image forming apparatus 300 after the approval server cooperating client 500 is installed on the image forming apparatus 300.

First, in step S1.1, the user logs in the image forming apparatus 300 using a login unit provided by the login application 1000 of the image forming apparatus 300. In the present exemplary embodiment, the login user has a user ID of user001. Next, in step S1.2, the login application 1000 generates a login context including user001 and stores the generated login context in the RAM 308 so that each application can acquire the login context via the application management framework 800.

Next, in step S1.3, the user operates the image forming apparatus 300 to execute the browser 900. More specifically, the user accesses via the browser 900 to an URL to cause the approval server cooperating client 500 to start approval cooperation. It is useful that the approval server cooperating client 500 is configured to respond to the user with an approval cooperation start screen 1801 illustrated in FIG. 7A.

If the approval server cooperating client 500 accepts an approval cooperation start instruction, then in step S1.4, the approval server cooperating client 500 transmits a redirect request to the browser 900 in such a way as to send an OAuth approval request to an URL described in the end-point URL 1603 of the device management table 1600. The approval request includes information about the client ID 1601 and the redirect URL 1604 of the device management table 1600. Further, according to OAuth, the approval request can be configured to include a scope that indicates an authority range to be approved. In the present exemplary embodiment, the requested scope is scope A.

Figure 7A:
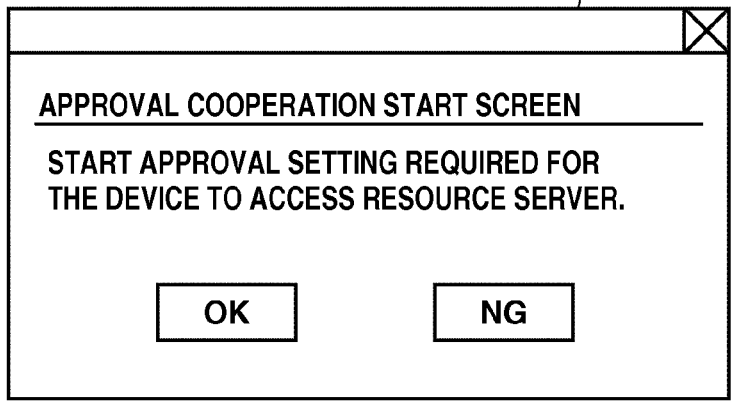
FIG. 7A illustrates an approval cooperation start screen.
Figure 7B:
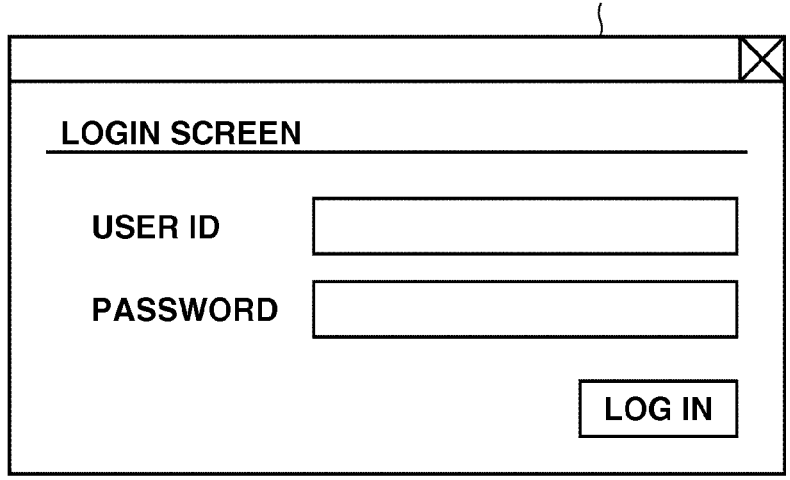
FIG. 7B illustrates a login screen.
Figure 7C:
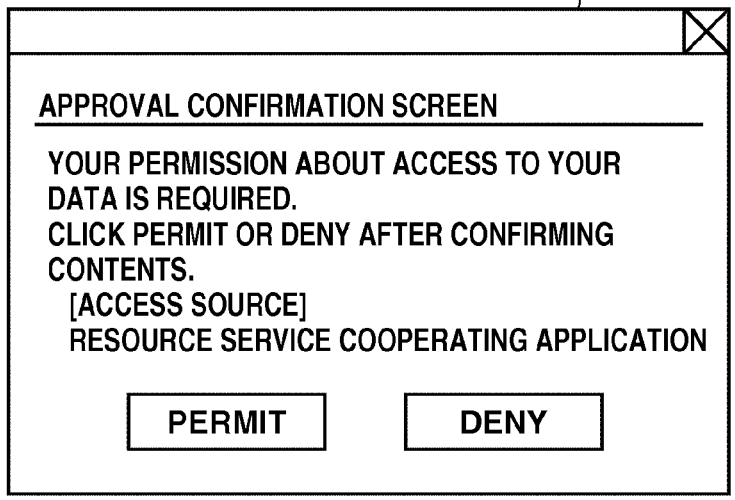
FIG. 7C illustrates an approval confirmation screen.

If the approval server 200 receives the approval request, then in step S1.5, the approval server 200 responds to the browser 900 with a login screen 1802 illustrated in FIG. 7B usable for user authentication. In step S1.6, the user inputs a user ID and a password via the login screen 1802 displayed on the browser 900 to complete a login operation. The approval server 200 verifies whether the received pair of user ID and password coincides with any information registered in the user management table 1200. If coincidence between the compared information is confirmed, the approval server 200 generates authentication information associated with the user ID and performs the following processing.

The approval server 200 verifies whether a pair of client ID and redirect URL included in the approval request coincides with the information registered in the client management table 1300. If coincidence between the compared information is confirmed, the approval server 200 acquires information about the client name 1302 from the client management table 1300. Then, in step S1.7, the approval server 200 generates an approval confirmation screen 1803 illustrated in FIG. 7C and responds to the browser 900 with the generated screen 1803. In this case, the authentication information can be stored as Cookie information and can be transmitted to the browser 900.

In the present exemplary embodiment, the approval confirmation screen 1803 displays the client name 1302. However, additionally displaying detailed description about the client or information about the login user is useful. Further, the approval confirmation screen 1803 can be configured to display information about the range of the scope in a case where the approval request includes a scope. Through the above-mentioned processing, the approval server 200 completes the authentication for the user and the authentication for the approval server cooperating client 500.

Next, in step S1.8, the user performs a permission operation via the approval confirmation screen 1803 displayed on the browser 900. When the approval server 200 receives a permission notice, the approval server 200 performs the following processing. The approval server 200 issues an approval code and registers the approval code in the approval token management table 1400. In this case, ID information of the issued token is registered in the approval token ID 1401. Information about the approval code is registered in the token type 1402 and the term of validity 1403. Further, the client ID included in the received approval request is registered in the client ID 1407. The user ID associated with the authentication information (Cookie) transmitted from the browser 900 is registered in the user ID 1408. Then, in step S1.9, the browser 900 transmits a redirect request, as an approval response, to a redirect URL to which an approval token ID of the approval code is allocated.

If the approval server cooperating client 500 receives the approval response, then in step S1.10, the approval server cooperating client 500 transmits a token request to the approval server 200. The token request includes the approval token ID of the approval code acquired in the approval response in addition to the client ID 1601, the client secret 1602, and the redirect URL 1604 of the device management table 1600. If the approval server 200 receives the token request, the approval server 200 performs the following verification processing.

If the verification processing has been successfully completed, then in step S1.11, the approval server 200 generates a parent token. The approval server 200 verifies whether a pair of client ID and client secret included in the received token request coincides with any combination of the user ID 1201 and the password 1202 registered in the user management table 1200. Next, the approval server 200 verifies whether the approval token ID of the approval code included in the received token request is already registered in the approval token management table 1400 and within the term of validity. Then, the approval server 200 verifies whether the client ID and the redirect URL included in the received token request coincide with the client ID 1407 identified by the approval token ID of the approval token management table 1400 and the redirect URL 1303 of the client management table 1300, respectively.

In the present exemplary embodiment, it is useful to add a column to the approval token management table 1400, not the client management table 1300, to register the redirect URL 1303 when the approval code is issued, so that verification for the redirect URL 1303 can be performed based on information of the added column. If coincidence between the compared information is confirmed in each of all verifications, the approval server 200 generates a parent token. In step S1.12, the approval server 200 responds to the approval server cooperating client 500 with an approval token ID of the parent token. In this case, the response content includes a refresh token ID issued together with the approval token ID.

The token ID issued for the parent token is registered in the approval token ID 1401. The parent token is registered in the token type 1402 and the term of validity 1403. Further, information transferred from the approval code is registered in the client ID 1407 and the user ID 1408. In this case, the approval server 200 issues a refresh token to refresh the parent token and registers information about the issued refresh token in the refresh token ID 1405 and the term of refreshment 1406. An example refreshing operation is described in detail below. In the present embodiment, the refresh token or any other information necessary to reissue the authority information is referred to as "reissue information."

If the approval server cooperating client 500 acquires the approval token ID and the refresh token ID of the parent token, then in step S1.13, the approval server cooperating client 500 acquires the login context of the user who is currently logged on the image forming apparatus 300 via the application management framework 800. Then, the approval server cooperating client 500 acquires a device user ID from the login context.

In step S1.14, the approval server cooperating client 500 stores the acquired device user ID, together with the approval token ID and the refresh token ID of the parent token in the parent token management table 1700. Then, in step S1.15, the approval server cooperating client 500 responds to the browser 900 with a screen (not illustrated) that indicates completion of the approval cooperation and completes the processing illustrated in FIG. 6.

The above-mentioned processing is example configuration and processing for delegating authority to a device apparatus by performing an approval operation for permitting a user to delegate authority that is necessary to use a service to the image forming apparatus 300 (i.e., the device apparatus). After the delegation of the user authority to the image forming apparatus 300 is completed, the image forming apparatus 300 delegates the authority to each application on behalf of the user.

Subsequently, an example sequence for delegating authority to an application on behalf of a user after the user authority is delegated to the image forming apparatus 300 is described in detail below with reference to FIG. 8. The sequence illustrated in FIG. 8 can be performed in response to a user instruction to start the resource service cooperating application 400 included in the image forming apparatus 300. In this case, it is necessary that the parent token acquisition sequence is already completed.

First, in step S2.1, the user logs in the image forming apparatus 300 using the login unit provided by the login application 1000 of the image forming apparatus 300. In the present exemplary embodiment, the login user has a user ID of user001. Next, in step S2.2, the login application 1000 generates a login context including user001 and stores the generated login context in the RAM 308 so that each application can acquire the login context via the application management framework 800. If the authority delegation sequence is continuously performed after completing the parent token acquisition sequence, it is unnecessary for the user to perform the login operation again. In this case, processing to be initially performed in the sequence illustrated in FIG. 8 is the next step S2.3.

Next, in step S2.3, the user operates the image forming apparatus 300 to access an application screen (not illustrated) of the resource service cooperating application 400. For example, the application screen is a screen that enables the user to select a document to be printed in a case where the resource service cooperating application 400 is a print application. The application screen is a screen that enables the user to select a business form to be generated in a case where the resource service cooperating application 400 is a business form application. In the present exemplary embodiment, accessing the application screen means that the user selects an application displayed on an operation panel of the image forming apparatus 300 in a state where each displayed application is brought into a started state by the application management framework 800.

If the user accesses the resource service cooperating application 400, then in step S2.4, the resource service cooperating application 400 acquires the login context from the application management framework 800. Then, in step S2.5, the resource service cooperating application 400 transmits a token acquisition request to a token acquisition interface of the approval server cooperating client 500 registered in the application management framework 800. In this case, the request includes the acquired login context. It is useful to request a scope that is necessary for the token. In the present exemplary embodiment, the requested scope is the scope A.

If the approval server cooperating client 500 receives the token acquisition request, then in step S2.6, the approval server cooperating client 500 acquires an application ID of the resource service cooperating application 400 (i.e., the request source) via the application management framework 800. An application ID acquisition sequence is described below.

The approval server cooperating client 500 performs the following processing after acquiring the application ID. First, the approval server cooperating client 500 verifies whether the acquired login context is valid via the application management framework 800. Then, if it is determined that the acquired login context is valid, the approval server cooperating client 500 acquires a device user ID associated with the login context.

In the present exemplary embodiment, the approval server cooperating client 500 performs the verification of the login context. However, only the application management framework 800 can generate an instance of the login context. It is feasible to determine that the login context is valid when the instance is generated.

Next, the approval server cooperating client 500 acquires the refresh token ID from the parent token management table 1700 with reference to the acquired device user ID. In this case, if the user ID is not registered in the parent token management table 1700, it is useful to display a screen (not illustrated) that recommends the user to perform the parent token acquisition sequence. Further, in some cases, it is useful to launch the browser 900 and automatically start the parent token acquisition sequence.

In step S2.7, the approval server cooperating client 500 transmits a token refresh request to the approval server 200 using the acquired refresh token ID as well as the client ID and the client secret of the device management table 1600. In the present exemplary embodiment, it is presumed that the term of validity for the parent token expires before starting a child token acquisition sequence because a significant time has elapsed after the completion of the parent token acquisition sequence. However, if the parent token is within the term of validity, it is useful to transmit a child token acquisition request in step S2.11 without processing the token refresh request.

If the approval server 200 receives the token refresh request, the approval server 200 performs the following processing. First, the approval server 200 verifies whether a pair of client ID and client secret included in the token refresh request coincides with any combination of the user ID 1201 and the password 1202 in the user management table 1200. If coincidence between the compared information is confirmed, the approval server 200 confirms whether the refresh token ID included in the token refresh request is already registered in the approval token management table 1400 and within the term of refreshment. Further, the approval server 200 verifies whether the client ID included in the token refresh request coincides with the client ID 1407. If coincidence between the compared information is confirmed in each of all verifications, then in step S2.8, the approval server 200 refreshes the parent token.

Further, in step S2.9, the approval server 200 responds to the approval server cooperating client 500 with the approval token ID and the refresh token ID of the refreshed parent token. As an example refreshing method, it is useful to issue a new pair of approval token ID and refresh token ID and register the issued pair in the approval token management table 1400. In this case, the token type 1402, the scope 1404, the client ID 1407, and the user ID 1408 of a record identified by the refresh token ID included in the received token refresh request are directly registered in the approval token management table 1400. Further, it is useful to nullify the previous refresh token ID after completing the above-mentioned refreshment. For example, forcibly terminating the term of validity is useful. Using the previous refresh token ID without issuing any new refresh token ID is also useful.

If the approval server cooperating client 500 acquires the refreshed parent token, then in step S2.10, the approval server cooperating client 500 registers the received information about the approval token ID and the refresh token ID in the parent token management table 1700.

Then, in step S2.11, the approval server cooperating client 500 transmits a child token acquisition request to the approval server 200 using the approval token ID of the parent token, the client ID and the client secret of the device management table 1600, the scope included in the received token acquisition request, and the acquired application ID. In this case, the application ID to be included in the child token acquisition request cannot be falsified by the resource service cooperating application 400, as described below. The child token acquisition request is equivalent to a request for delegating authority to the application after it is delegated from a user.

If the approval server 200 receives the child token acquisition request, the approval server 200 performs the following processing. First, the approval server 200 verifies whether a pair of client ID and client secret included in the child token acquisition request coincides with any combination of the user ID 1201 and the password 1202 in the user management table 1200. If coincidence between the compared information is confirmed in the verification, the approval server 200 confirms whether the approval token ID included in the child token acquisition request is already registered in the approval token management table 1400 and within the term of validity.

Further, the approval server 200 verifies whether the client ID included in the child token acquisition request coincides with the client ID 1407. If coincidence between the compared information is confirmed in all of the above-mentioned verifications, then in step S2.12, the approval server 200 generates a child token. Further, in step S2.13, the approval server 200 responds to the approval server cooperating client 500 with the generated child token.

The approval server 200 issues a new approval token ID for the generated child token. As information to be registered in the approval token management table 1400, the child token is registered in the token type 1402. The acquired application ID is registered in the application ID 1409. The scope included in the child token acquisition request is registered in the scope 1404.

In this case, the client ID 1407 and the user ID 1408 of a record identified by the approval token ID included in the received child token acquisition request are directly registered. As a result, the child token issued in this case is associated with the user ID required to identify the user, the client ID required to identify the image forming apparatus, and the application ID required to identify the application. No refresh token is issued for the child token to eliminate any security risk. For example, the term of validity of a token can be freely updated when each application leaks the refresh token. Each application that uses the child token cannot issue the refresh request because the client ID and the client secret are necessary to issue the token refresh request.

If the approval server cooperating client 500 acquires the approval token ID of the child token, the approval server cooperating client 500 responds to the resource service cooperating application 400 (i.e., the request source) with the approval token ID of the child token. If the resource service cooperating application 400 acquires the approval token ID of the child token, then in step S2.14, the resource service cooperating application 400 transmits a resource request including the approval token ID to the resource server 210.

If the resource server 210 receives the resource request, then in step S2.15, the resource server 210 requests the approval server 200 to perform token verification for the approval token ID of the child token included in the request. The token verification request can include the scope. If the approval server 200 receives the token verification request, then in step S2.16, the approval server 200 verifies whether the received approval token ID is already registered in the approval token management table 1400 and within the term of validity. Further, the approval server 200 verifies whether the received scope is within the range of the scope 1404. Then, in step S2.17, the approval server 200 responds to the resource server 210 with a verification result.

Next, in step S2.18, the resource server 210 requests the approval server 200 to acquire token information about the approval token ID of the child token. If the approval server 200 receives the token information acquisition request, then in step S2.19, the approval server 200 acquires information that can be identified by the received approval token ID from the approval token management table 1400 and responds to the resource server 210 with the acquired information. The response to be transmitted in this case includes, for example, information about the scope 1404, the client ID 1407, the user ID 1408, and the application ID 1409. The response can further include information about the serial number 1304 registered in the client management table 1300, which can be identified by the client ID 1407.

If the resource server 210 acquires the token information, the resource server 210 determines whether to permit or deny an access to a requested target resource based on the acquired information. In the present exemplary embodiment, it is presumed that information about accessible application ID is set beforehand in the resource server 210. Therefore, in step S2.20, the resource server 210 verifies whether to permit the access based on a comparison between the application ID acquired from the token information and each application ID having been set beforehand.

If it is verified that the access is permissible, then in step S2.21, the resource server 210 responds to the resource service cooperating application 400 with the requested resource. The resource to be transmitted in this case is, for example, a list of printable documents when the resource server 210 is a printing service or a list of creatable business forms when the resource server 210 is a business form service. The resource server 210 can set the application ID beforehand by acquiring the application ID from a distribution server that distributes the resource service cooperating application 400 to the image forming apparatus 300. Alternatively, an administrator of the resource server 210 can manually set the application ID if a request is received from a developer of the resource service cooperating application 400.

In the above-described processing in step S2.15 to step S2.20, each of the approval server 200 and the resource server 210 performs token verification processing. Alternatively, it is useful that the approval server 200 manages applications accessible to the resource and the approval server 200 performs every verification processing. Further, in the present exemplary embodiment, information to be used in determining an accessible application is the application ID. However, it is useful to identify the image forming apparatus 300 based on the serial number or the client ID that is acquirable from the token information and determine the accessibility based on the acquired information. Similarly, it is useful to determine the accessibility based on the scope or the user ID that is acquirable from the token information.

If the resource service cooperating application 400 receives the resource response, then in step S2.22, the resource service cooperating application 400 constitutes the above-mentioned application screen based on the received data and responds to the user with the created application screen.

Through the parent token acquisition sequence and the child token acquisition sequence having been mentioned above, it is feasible to complete the user approval by performing its operation only one time, and the resource server 210 can identify the application having accessed. Further, the resource server 210 can recognize an access from the resource service cooperating application 400 that has correctly acquired the child token.

Next, an example method applicable to the resource service cooperating application 400 that transmits a token acquisition request to the approval server cooperating client 500 and an example method applicable to the approval server cooperating client 500 that acquires an application ID of a request source are described in detail below.

FIG. 10A illustrates an example configuration of an application file 1900 of an application to be installed. The application file 1900 includes an application definition file 1901 and an application 1902 (i.e., the substance of the application). Further, the application file 1900 is enciphered in such a way as to include the application definition file 1901 and the application 1902. A decoding key is described in a license file 1910. The application definition file 1901 includes information about application ID (i.e., information that uniquely identifies each application), version of the application, and application name. Further, the application definition file 1901 includes a description defining the resource amount of a storage area to be consumed by the application or a class path of a class to be executed when the application is started.

FIG. 10B illustrates an example configuration of the license file 1910 that is required when the application is installed. The license file 1910 includes an application decoding key 1911 that is usable to decode the application file 1900. Further, the license file 1910 is enciphered with a public key and can be decoded with a secret key stored in the application management application 830. The above-mentioned configuration is useful to defend the application definition file 1901 and the application 1902 against falsification unless the secret key stored in the application management application 830 leaks.

FIG. 10C illustrates an application management table 1920 that can be managed by the application management framework 800. The application management table 1920 includes information about application ID 1921, version 1922, application name 1923, storage location 1924, and state 1925.

Further, the application management framework 800 manages a list of application objects that are loaded in the RAM 308 when each application is executed. An application ID of each application object registered in the list is associated with the information of the application management table 1920, so that the information of each item in the application management table 1920 can be referred to. Further, the list of application objects can be acquired from the application management application 830 via the I/F of the application management framework 800.

Next, an example sequence for installing an application on the image forming apparatus 300 and an example sequence for starting the application are described in detail below with reference to FIG. 9. Further, processing similar to that described in FIG. 8 is denoted by the same sequence number. Redundant description thereof will be avoided.

First, an application installation sequence is described in detail below. In step S3.1, a user accesses an application management screen (not illustrated) included in the application management application 830 of the image forming apparatus 300 using a web browser running on a personal computer (PC) (not illustrated). In step S3.2, the application management application 830 responds to the user with the application management screen. In this case, it is useful to display a login screen (not illustrated) so that the user can perform requisite authentication to access the application management application 830.

Next, in step S3.3, the user uploads the application file 1900 to be installed together with the license file 1910 via the application management screen and instructs installing these files. In the present exemplary embodiment, it is presumed that the upload resource service cooperating application 400 is a print application.

If the application management application 830 receives the application file 1900 and the license file 1910, the application management application 830 performs the following processing. The application management application 830 decodes the license file 1910 with the secret key stored in the application management application 830. If the decoding processing has been successfully completed, the application management application 830 acquires the application decoding key 1911 from the license file 1910.

Next, the application management application 830 decodes the received application file 1900 with the application decoding key 1911. The application management application 830 acquires the application definition file 1901 from the decoded application file 1900 and analyzes definition contents. When the decoding processing has been successfully completed with the application decoding key 1911 and the application definition file 1901 has been analyzed, it can be determined that the contents described in the application definition file 1901 are correct.

Further, the application file 1900 can be configured to store the application definition file 1901 and a file that describes a signature value of the application 1902. In this case, highly assuring that the application ID is not falsified is feasible by verifying the signature value after completing the decoding with the application decoding key 1911. When the decoding of the application file 1900 using the application decoding key 1911 is failed and/or when the signature value is incorrect, the installation target application is not installed because there is a possibility that the application is falsified.

If the application definition file 1901 and the application 1902 are acquired through the decoding processing, the application management application 830 stores the application definition file 1901 and the application 1902 in the image forming apparatus 300 via the I/F of the application management framework 800.

In step S3.5, the application management application 830 develops the application definition file 1901 and stores information about the storage location together with additional information (e.g., application ID and version) in the application management table 1920. Further, in this case, a note "already installed" is registered in the state 1925.

Next, an application start sequence is described in detail below. It is presumed that the resource service cooperating application 400 and the approval server cooperating client 500 are already installed on the image forming apparatus 300.

In step S3.6, the user instructs the application management application 830 to start the approval server cooperating client 500 using the web browser running on a personal computer (PC) (not illustrated) or the image forming apparatus 300. The application management application 830 identifies the storage location of the approval server cooperating client 500 based on the information of the application management table 1920. The application management application 830 instructs the approval server cooperating client 500 to start the application via the I/F of the application management framework 800.

If the approval server cooperating client 500 receives the application start instruction, then in step S3.7, the approval server cooperating client 500 registers an interface that is required to receive a child token acquisition request in the application management framework 800. If the application management framework 800 receives the registration, the application management framework 800 stores the registered interface. If the above-mentioned interface registration has been completed, then in step S3.8, the approval server cooperating client 500 responds to the application management framework 800 with the start of the application.

In step S3.9, the application management framework 800 changes the state 1925 of the approval server cooperating client 500 to "start" state, and stores the application object started in an application object list. The application object is substantially similar to an instance possessing an actual state of the application.

Next, in step S3.10, the user instructs the application management application 830 to start the resource service cooperating application 400 using the web browser (not illustrated) running on the PC (not illustrated) or the image forming apparatus 300. The application management application 830 identifies the storage location of the resource service cooperating application 400 based on the information of the application management table 1920. Then, the application management application 830 instructs the resource service cooperating application 400 to start the application via the application management framework 800.

If the resource service cooperating application 400 receives the application start instruction, then in step S3.11, the resource service cooperating application 400 executes application initialization processing and responds to the application management framework 800 with the start of the application. In step S3.12, the application management framework 800 changes the state 1925 of the resource service cooperating application 400 to "start" and stores the application object started in the application object list.

Through the above-mentioned sequence, the application management framework 800 starts each application installed on the image forming apparatus 300. Further, it is feasible to store application ID described in the application definition file of each application in such a way as to be referred to by each application object. Further, as the application management framework 800 can receive an interface registration from an application, it is feasible to store an interface registered by other application in such a way as to be executable. In this case, as an example interface registration method, it is useful to use a class path for a class in which the interface is defined (i.e., a reference path to a class definition).

Next, the operation to be performed by the user in step S2.3 to access the application screen of the resource service cooperating application 400 is described in detail below. As mentioned above, if the resource service cooperating application 400 acquires the login context in step S2.4, then in step S2.5, the resource service cooperating application 400 transmits the token acquisition request to the approval server cooperating client 500.

In this case, in step S3.13, the resource service cooperating application 400 transmits an acquisition request to the application management framework 800 to acquire an interface registered in the application management framework 800. If the application management framework 800 receives the interface acquisition request, then in step S3.14, the application management framework 800 identifies a request source application from the list of application objects and acquires an application ID described in the application definition file.

In the present exemplary embodiment, as an example method for identifying an application object that has transmitted the interface acquisition request, it is useful to store an object of the application as a reference in an argument of the interface acquisition request. However, the method for identifying an application object of the interface acquisition request source is not limited to the above-mentioned method. For example, a reverse lookup function of the virtual machine 810 is available to identify the request source.

Then, in step S3.15, the application management framework 800 substantiates the interface definition class of the reference destination based on the class path of the interface definition class registered from the approval server cooperating client 500 and issues an object generation request. In this case, the application management framework 800 sets the acquired application ID of the resource service cooperating application 400 in such a way as to be included in the object generation request.

If the approval server cooperating client 500 receives the object generation request, the approval server cooperating client 500 generates an object of the interface definition class to which the application ID is set and responds to the application management framework 800 with the generated object. Then, in step S3.16, the application management framework 800 responds to the resource service cooperating application 400 with the generated object of the interface definition class.

If the resource service cooperating application 400 acquires the object of the interface of the approval server cooperating client 500, then in step S2.5, the resource service cooperating application 400 transmits the token acquisition request defined in the interface definition class. In step S2.6, the approval server cooperating client 500 acquires the application ID having been set in the object of the interface definition class that has received the token acquisition request. Through the above-mentioned sequence, the approval server cooperating client 500 can acquire the application ID while preventing any falsification by the application.

The above-mentioned sequence is effective in improving convenience because the approval operation to be performed to issue a child token is only one time. Namely, independently performing the approval operation for each of a plurality of applications in the same image forming apparatus is unnecessary. Further, it becomes feasible to identify an application of an access source at a cloud service side without being falsified.

Next, an example case in which the timer service 1100 notifies an application of a timer event at time having been set beforehand and the application performs batch execution is described in detail below. In the following description, it is presumed that the timer service launches the resource service cooperating application 400 to perform batch execution without any operation by a login user.

In a case where a user logs in the image forming apparatus to launch an application, the approval server cooperating client 500 refers to the parent token management table 1700 because the image forming apparatus stores a parent token in association with a login context. On the other hand, in a case where the timer service causes batch execution of the application at the time having been set beforehand, the approval server cooperating client 500 refers to a batch execution parent token management table 2700.

FIG. 11A illustrates a token request management table 1930. Only the approval server cooperating client 500 can refer to or update the token request management table 1930.

The token request management table 1930 includes information about application ID 1931 and state ID 1932. The application ID 1931 and the state ID 1932 correspond to information about application ID and state ID to be acquired and generated in step S4.5 in FIG. 12. The state ID 1932 is ID information required to manage a session of parent token acquisition in a batch execution parent token acquisition sequence illustrated in FIG. 12. The approval server cooperating client 500 generates the state ID 1932 in response to a token acquisition request transmitted from the resource service cooperating application 400.

Hereinafter, in the sequence illustrated in FIG. 12, the generated state ID serves as a request/response session ID usable between the resource service cooperating application 400 and the approval server cooperating client 500. Further, similarly, the state ID serves as a request/response session ID usable between the approval service cooperating client 500 and the approval server 200.

FIG. 11C illustrates the batch execution parent token management table 2700. Only the approval server cooperating client 500 can refer to or update the batch execution parent token management table 2700. The batch execution parent token management table 2700 includes information about application ID 2701, cloud user ID 2702, approval token ID 2703, refresh token ID 2704, and state ID 2705. Example processing relating to the batch execution parent token management table 2700 is described in detail below.

The batch execution parent token management table 2700 is similar to the parent token management table 1700 in that the batch execution parent token management table 2700 is usable to manage the parent token. In a case where a user logs in the image forming apparatus 300 to execute an application cooperating with a cloud service, the approval server cooperating client 500 selects and uses the parent token management table 1700. On the other hand, in a case where batch execution of an application cooperating with the cloud service is performed without any operation by a login user, the approval server cooperating client 500 selects and uses the batch execution parent token management table 2700.

In a case where the image forming apparatus 300 does not have any user management function although it can execute an application cooperating with the cloud service, a parent token to be used cannot be fixed because it is difficult to identify each user. It is difficult to enable a plurality of users to perform batch reservation. Further, even when the image forming apparatus 300 has the user management function, it is feasible to discriminate information by managing a cloud access token in association with a login user ID of a device.

However, if the user is not in a login state, identifying the parent token is unfeasible because the login context is not present. Further, the batch execution is the processing to be performed by accessing the cloud service on behalf of a user who is not logged on the device. Therefore, if the token is commonly usable between two or more applications, the token may be incorrectly issued due to an incorrect spoof of the application.

Therefore, it is guaranteed that the resource server 210 of the cloud service is managed using the cloud user ID. Therefore, in the batch execution parent token management table 2700, the parent token is managed in association with the cloud user ID (i.e., identification information).

FIG. 13B illustrates a batch setting screen, which enables users to set information about the cloud user ID and information about time when the resource service cooperating application 400 is subjected to the batch execution. As illustrated in FIG. 13B, it is useful to provide a plurality of time setting fields. Each user can input numerical values (hour and minute) about the time to start the batch execution via the setting screen and press a setting button.

FIG. 15 illustrates a timer service setting time management table 3000. Each of the timer service 1100, the resource service cooperating application 400, and the approval server cooperating client 500 of the image forming apparatus 300 can refer to or update the timer service setting time management table 3000. The timer service setting time management table 3000 includes information about application ID 3001 and timer notification time 3002. Example processing relating to the timer setting time management table 3000 is described in detail below.

FIG. 16 illustrates a batch execution time management table 4000. The resource service cooperating application 400 can refer to or update the batch execution time management table 4000. The batch execution time management table 4000 includes information about cloud user ID 4001 and the batch execution time 4002. Example processing relating to the batch execution time management table 4000 is described in detail below.

An example of the batch execution parent token acquisition sequence according to the present exemplary embodiment is described in detail below with reference to FIGS. 11, 12, 13, and 16. When a user logs in the image forming apparatus to launch an application, the approval server cooperating client 500 performs parent token acquisition processing according to the sequence illustrated in FIG. 6. On the other hand, when the timer service causes the application to perform batch execution at time having been set beforehand, the approval server cooperating client 500 performs batch execution parent token acquisition processing according to the sequence illustrated in FIG. 12.

The sequence illustrated in FIG. 12 is started in response to an operation of a user who initially performs batch execution settings in each application that performs batch execution using the image forming apparatus 300. First, in step S4.1, the user logs in the image forming apparatus 300 using the login unit provided by the login application 1000 of the image forming apparatus 300. In the present exemplary embodiment, the login user has a user ID of user001. Next, in step S4.2, the login application 1000 generates a login context including user001 and stores the generated login context in the RAM 308 so that each application can acquire the login context via the application management framework 800.

Next, the user operates the image forming apparatus 300 to execute the browser 900. Then, in step S4.3, the user accesses the resource service cooperating application 400 via the browser 900 and further accesses the URL of the resource service cooperating application 400 to start batch settings. For example, the user can directly designate URL via the browser 900 to access the URL of the resource service cooperating application 400 to start batch settings.

Alternatively, it is useful to configure the input screen of the image forming apparatus 300 to display a batch setting start screen illustrated in FIG. 13A. If the user completes the URL designation to instruct starting the batch settings for the resource service cooperating application 400, then in step S4.4, the resource service cooperating application 400 transmits a token storing request to the approval server cooperating client 500.

If the approval server cooperating client 500 receives the token storing request, then in step S4.5, the approval server cooperating client 500 acquires the application ID of the resource service cooperating application 400 (i.e. the request source) via the application management framework 800. If the approval server cooperating client 500 acquires the application ID, the approval server cooperating client 500 generates UUID for the token storing request and issues it as a state ID. At the same time, the approval server cooperating client 500 stores the application ID and the state ID in the parent token management table 2700 illustrated in FIG. 11C.

Next, in step S4.6, the approval server cooperating client 500 notifies the resource service cooperating application 400 of the state ID. If the resource service cooperating application 400 receives the notification about the state ID, then in step S4.7, the resource service cooperating application 400 transmits a redirect request to the browser 900 in such a way as to send an OAuth approval request to the approval server cooperating client 500 together with the state ID and the URL acquired from the end-point URL 1603 of the device management table 1600.

The approval request includes information about the client ID 1601 and the redirect URL 1604 of the device management table 1600 and information about the state ID 1921 notified from the approval server cooperating client 500. If the browser 900 receives the redirect request, then in step S4.8, the browser 900 transmits a redirect request to cause the approval server cooperating client 500 to start approval cooperation processing.

If the approval server cooperating client 500 receives the start of the approval cooperation processing, then in step S4.9, the approval server cooperating client 500 transmits a redirect request to the browser 900 in such a way as to send an OAuth approval request to the URL described in the end-point URL 1603 of the device management table 1600. The approval request includes information about the client ID 1601 and the redirect URL 1604 of the device management table 1600 and information about the state ID 1921 notified from the approval server cooperating client 500. Further, according to OAuth, the approval request can be configured to include a scope that indicates an authority range to be approved. In the present exemplary embodiment, the requested scope is scope A. Further, according to OAuth, the approval request can be configured to include the state. In the present exemplary embodiment, the state included in the approval request is the state ID generated by the approval server cooperating client 500 in response to the token storing request.

If the approval server 200 receives the approval request, then in step S4.10, the approval server 200 responds to the browser 900 with the login screen 1802 illustrated in FIG. 7B that is usable for user authentication. In step S4.11, the user performs a login operation by inputting user ID and password via the login screen 1802 displayed on the browser 900. The approval server 200 verifies whether the received pair of user ID and password coincides with any information registered in the user management table 1200.

If coincidence between the compared information is confirmed, the approval server 200 generates authentication information associated with the user ID and performs the following processing. The approval server 200 verifies whether a pair of client ID and redirect URL included in the approval request coincides with the information registered in the client management table 1300.

If coincidence between the compared information is confirmed, the approval server 200 acquires information about the client name 1302 from the client management table 1300. Then in step S4.12, the approval server 200 generates the approval confirmation screen 1803 illustrated in FIG. 7C and responds to the browser 900 with the generated screen 1803. In this case, the authentication information can be stored as Cookie information and can be transmitted to the browser 900.

In the exemplary embodiment, the approval confirmation screen 1803 displays the client name 1302. However, additionally displaying detailed description about the client or information about the login user is useful. Further, the approval confirmation screen 1803 can be configured to display information about the range of the scope in a case where the approval request includes a scope.

Next, in step S4.13, the user performs a permission operation via the approval confirmation screen 1803 displayed on the browser 900. When the approval server 200 receives a permission notice, the approval server 200 performs the following processing. The approval server 200 issues an approval code and registers the approval code in the approval token management table 1400. In this case, ID information of the issued token is registered in the approval token ID 1401. Information about the approval code is registered in the token type 1402 and the term of validity 1403. Further, the client ID included in the received approval request is registered in the client ID 1407. The user ID associated with the authentication information (Cookie) transmitted from the browser 900 is registered in the user ID 1408. Then, in step S4.14, the browser 900 transmits a redirect request, as an approval response, to a redirect URL to which an approval token ID of the approval code is allocated.

If the approval server cooperating client 500 receives the approval response, then in step S4.15, the approval server cooperating client 500 transmits a token request to the approval server 200. The token request includes the approval token ID of the approval code acquired in the approval response in addition to information about the client ID 1601, the client secret 1602, and the redirect URL 1604 of the device management table 1600. If the approval server 200 receives the token request, the approval server 200 performs the following verification processing.

If the verification processing has been successfully completed, then in step S4.16, the approval server 200 generates a parent token. The approval server 200 verifies whether a pair of client ID and client secret included in the received token request coincides with any combination of the user ID 1201 and the password 1202 registered in the user management table 1200. Next, the approval server 200 verifies whether the approval token ID of the approval code included in the received token request is already registered in the approval token management table 1400 and within the term of validity.

Then, the approval server 200 verifies whether the client ID and the redirect URL included in the received token request coincide with the client ID 1407 identified by the approval token ID of the approval token management table 1400 and the redirect URL 1303 of the client management table 1300, respectively.

In the present exemplary embodiment, it is useful to add a column to the approval token management table 1400, not the client management table 1300, to register the redirect URL 1303 when the approval code is issued, so that verification for the redirect URL 1303 can be performed based on information of the added column. If coincidence between the compared information is confirmed in each of all verifications, the approval server 200 generates a parent token. In step S4.17, the approval server 200 responds to the approval server cooperating client 500 with an approval token ID of the parent token. In this case, the response content includes a refresh token ID issued together with the approval token ID.

The token ID issued for the parent token is registered in the approval token ID 1401. The parent token is registered in the token type 1402 and the term of validity 1403. Further, information transferred from the approval code is registered in the client ID 1407 and the user ID 1408. In this case, the approval server 200 issues a refresh token to refresh the parent token and registers information about the issued refresh token in the refresh token ID 1405 and the term of refreshment 1406. An example refreshing operation is described in detail below.

If the approval server cooperating client 500 acquires the parent token, then in step S4.18, the approval server cooperating client 500 transmits the parent token to the approval server 200 and requests information about the cloud user ID. In response to the request of the cloud user ID, the approval server 200 verifies whether the parent token included in the cloud user ID request is included in the parent token ID 1401 of the approval token management table 1400.

If the parent token included in the cloud user ID request is included in the parent token ID 1401, the approval server 200 confirms whether the parent token ID included in the cloud user ID request is within the term of refreshment. Further, the approval server 200 verifies whether the client ID included in the token refresh request coincides with the client ID 1407.

If coincidence between the compared information is confirmed in all of the above-mentioned verifications, then in step S4.19, the approval server 200 transmits a cloud user ID of the user ID 1408 in the approval token management table 1400, which coincides with the parent token ID included in the cloud user ID request.

If the approval server cooperating client 500 acquires the cloud user ID, then in step S4.20, the approval server cooperating client 500 stores the application ID, the cloud user ID, the parent token approval token ID, the refresh token ID, and the state ID in the parent token management table 2700 illustrated in FIG. 11C.

Then, in step S4.21, the approval server cooperating client 500 transmits a redirect request to the browser 900 in such a way as to request the resource service cooperating application 400 to acquire the cloud user ID. In this case, URL is batch setting URL that is internally stored. If the browser 900 receives the redirect request, then in step S4.22, the browser 900 transmits a redirect request to the resource service cooperating application 400 in such a way as to display the batch setting screen of the batch setting URL.

If the resource service cooperating application 400 is requested to display the batch setting screen, then in step S4.23, the resource service cooperating application 400 transmits a cloud user ID acquisition request together with state ID to the approval server cooperating client 500 to identify the authenticated cloud user having issued the token storing request based on the state ID. If the approval server cooperating client 500 receives the cloud user ID acquisition request, then in step S4.24, the approval server cooperating client 500 responds to the resource service cooperating application 400 with cloud user ID information that matches the cloud user ID 2702 in the parent token management table 2700 based on the notified state ID.

If the resource service cooperating application 400 receives the cloud user ID having matched the token storing request, then in step S4.25, the resource service cooperating application 400 causes the browser 900 to display the batch setting screen illustrated in FIG. 13B together with the cloud user ID. In step 4.26, the user sets batch execution time on the batch setting screen illustrated in FIG. 13B.

The batch execution time setting can be performed in the following manner. If the resource service cooperating application 400 receives user input contents via the batch setting screen, the resource service cooperating application 400 sets its application ID and the batch execution time in the fields of the application ID 3001 and the timer notification time 3002 of the timer setting time management table 3000 illustrated in FIG. 15 via the timer service 1100 of the image forming apparatus 300. At the same time, the resource service cooperating application 400 sets the cloud user ID and the batch execution time in the fields of the cloud user ID 4001 and the batch execution time 4002 of the batch execution time management table 4000 illustrated in FIG. 16.

The timer service 1100 illustrated in FIG. 3 has a function of setting ID information about a timer setting source application and timer notification time in the timer setting time management table illustrated in FIG. 15 in response to a request from an application installed on the image forming apparatus 300. The timer service 1100 has a function of managing time for each application ID and notifying an application of a timer event at time having been set beforehand.

An example sequence according to the present exemplary embodiment, in which the resource service cooperating application 400 acquires a child token and performs processing when the batch execution time having been set beforehand has come after the parent token is issued, is described in detail below with reference to FIG. 14.

Figure 8B:
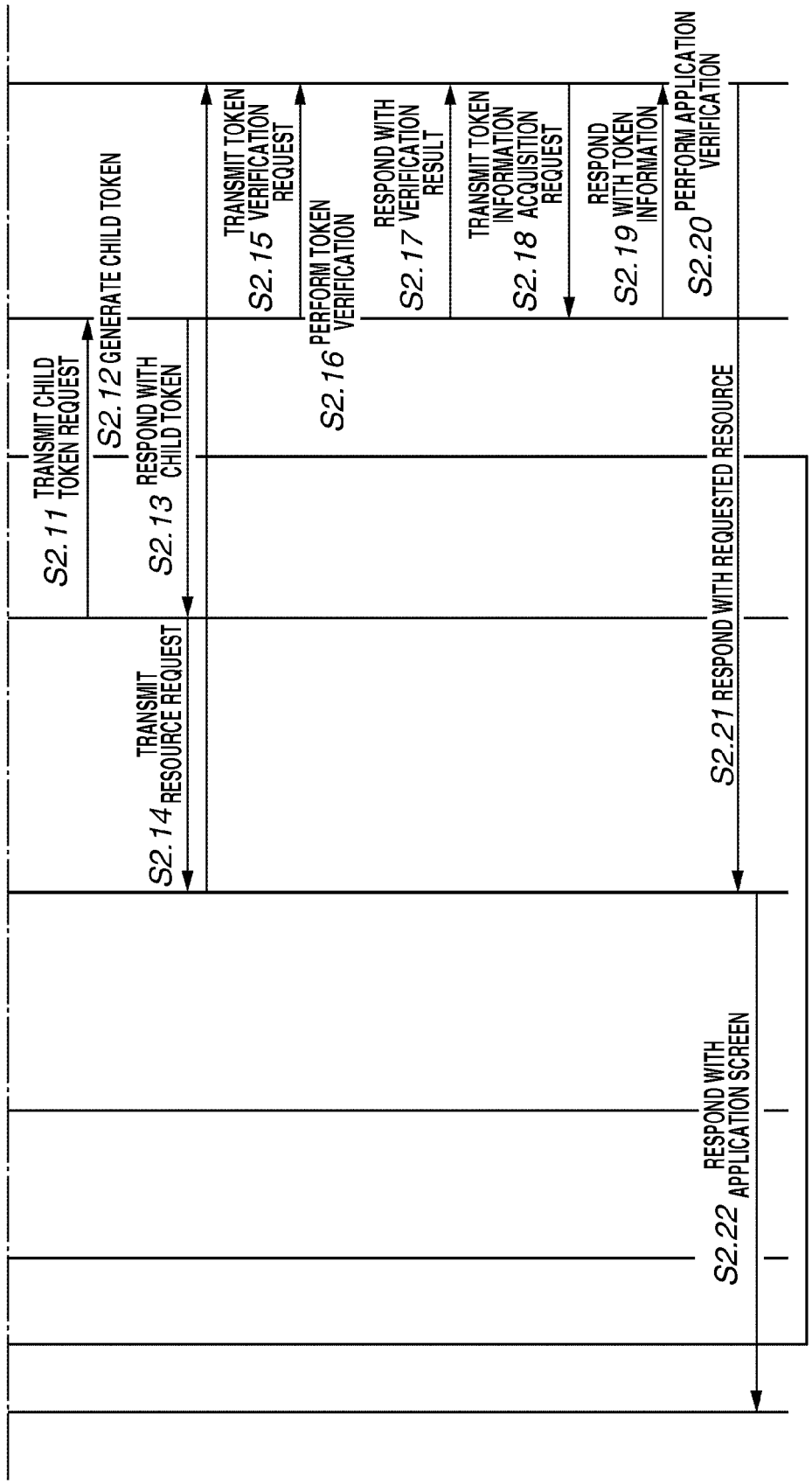
FIG. 8 is a diagram illustrating a child token issuance sequence.

In a case where a user logs in the image forming apparatus to launch an application, the resource service cooperating application 400 acquires a child token and performs application processing according to the sequence illustrated in FIG. 8. On the other hand, when the timer service causes the application to perform batch execution at time having been set beforehand, the resource service cooperating application 400 acquires a child token and performs application processing according to the sequence illustrated in FIG. 14.

Figure 14:
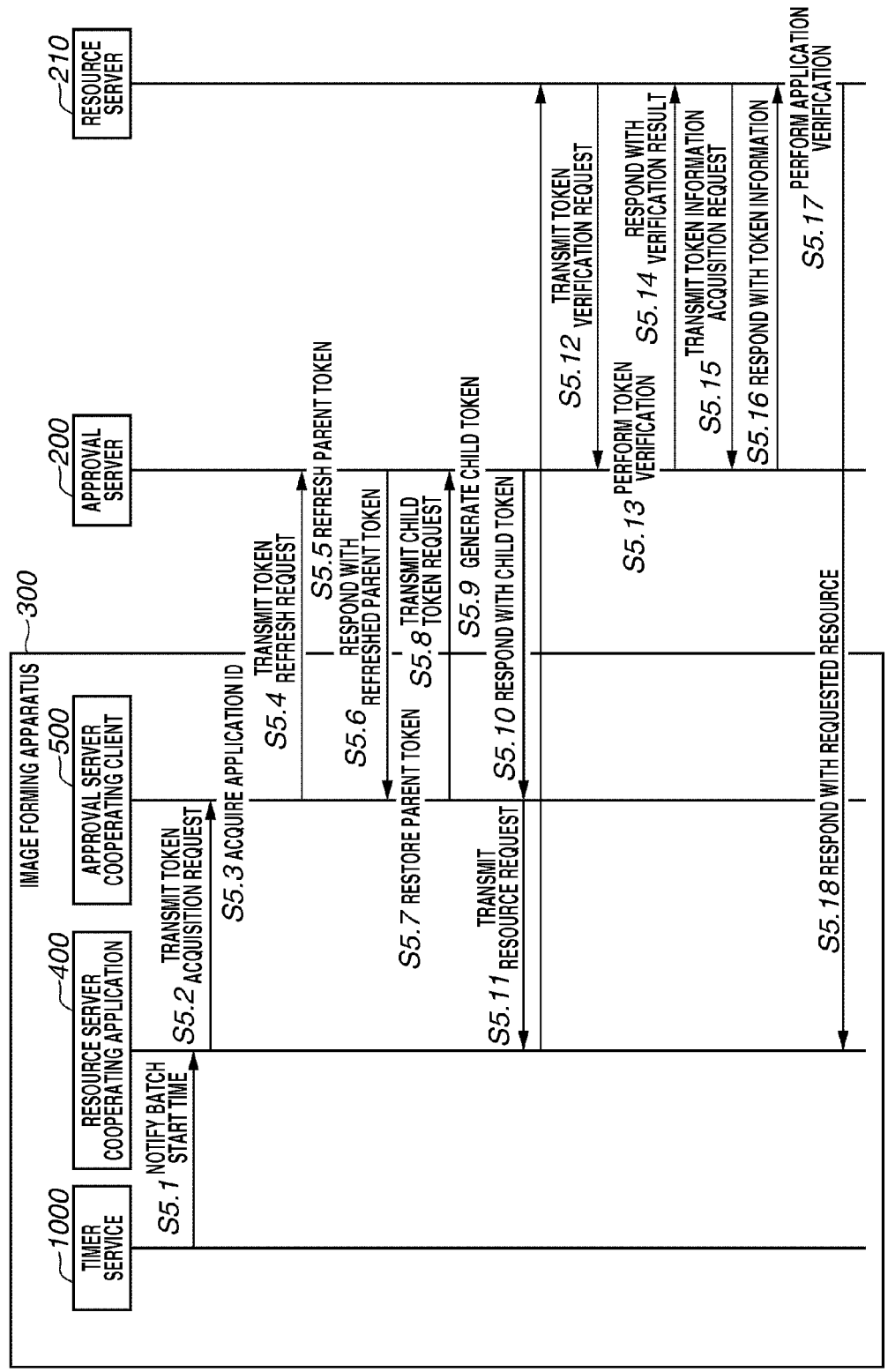
FIG. 14 is a diagram illustrating a child token issuance sequence dedicated to batch processing.

The sequence illustrated in FIG. 14 can be performed when the timer service 1100 notifies the resource service cooperating application 400 of a timer event at time having been set beforehand and the batch execution is performed. In this case, it is necessary that the parent token acquisition sequence illustrated in FIG. 12 is already completed.

In the time management performed by the image forming apparatus 300, if the batch execution time having been set beforehand by the timer service 1100 has come, a timer event is sent to an application corresponding to a set application ID from the timer service 1100.

In the present exemplary embodiment, in step S5.1, the timer service 1100 notifies the resource service cooperating application 400 of a timer event at time having been set by the resource service cooperating application 400 in step S4.26. If the resource service cooperating application 400 receives the timer notification, the resource service cooperating application 400 refers to the batch execution time management table 4000 to search for the batch execution time 4002 that corresponds to the timer notification time and acquires corresponding information of the cloud user ID 4001.

Then, in step S5.2, the resource service cooperating application 400 transmits a token acquisition request to a token acquisition interface of the approval server cooperating client 500 registered in the application management framework 800. In this case, the request includes the acquired cloud user ID. It is useful to request a scope that is necessary for the token. In the present exemplary embodiment, the requested scope is the scope A.

If the approval server cooperating client 500 receives the token acquisition request, then in step S5.3, the approval server cooperating client 500 acquires the application ID of the resource service cooperating application 400 (i.e., the request source) via the application management framework 800.

If the approval server cooperating client 500 acquires the application ID and the cloud user ID, the approval server cooperating client 500 performs the following processing. The approval server cooperating client 500 acquires refresh token ID from the parent token management table 2700 with reference to the acquired cloud user ID. In this case, if the cloud user ID is not registered in the parent token management table 2700, it is useful to display a screen (not illustrated) that recommends the user to perform the parent token acquisition sequence. Further, in some cases, it is useful to launch the browser 900 and automatically start the parent token acquisition sequence.

The batch execution parent token management table 2700 is similar to the parent token management table 1700 described in the first exemplary embodiment in that the batch execution parent token management table 2700 is usable to manage the parent token. In a case where a user logs in the image forming apparatus 300 to execute an application cooperating with a cloud service, the image forming apparatus 300 selects and uses the parent token management table 1700. On the other hand, in a case where batch execution of an application cooperating with the cloud service is performed without any operation by a login user, the image forming apparatus 300 selects and uses the batch execution parent token management table 2700.

In step S5.4, the approval server cooperating client 500 transmits a token refresh request to the approval server 200 using the acquired refresh token ID as well as the client ID and the client secret of the device management table 1600. In the present exemplary embodiment, it is presumed that the term of validity for the parent token expires before starting the child token acquisition sequence because a significant time has elapsed after the completion of the parent token acquisition sequence. However, if the parent token is within the term of validity, it is useful to transmit the child token acquisition request in step S5.8 without processing the token refresh request.

When the approval server 200 receives the token refresh request, the approval server 200 performs the following processing. First, the approval server 200 verifies whether a pair of client ID and client secret included in the token refresh request coincides with any combination of the user ID 1201 and the password 1202 in the user management table 1200. If coincidence between the compared information is confirmed in the verification, the approval server 200 confirms whether the refresh token ID included in the token refresh request is already registered in the approval token management table 1400 and within the term of refreshment.

Further, the approval server 200 verifies whether the client ID included in the token refresh request coincides with the client ID 1407. Then, if coincidence between the compared information is confirmed in all of the above-mentioned verifications, then in step S5.6, the approval server 200 refreshes the parent token and responds to the approval server cooperating client 500 with an approval token ID and a refresh token ID of the refreshed parent token.

For example, a refresh method includes newly issuing approval token ID and refresh token ID and registering the issued ID information in the approval token management table 1400. In this case, the token type 1402, the scope 1404, the client ID 1407, and the user ID 1408 of a record identified by the refresh token ID included in the received token refresh request are directly registered. Further, it is useful to nullify the previous refresh token ID after completing the above-mentioned refreshment. For example, forcibly terminating the term of validity is useful. Using the previous refresh token ID without issuing any new refresh token ID is also useful.

If the approval server cooperating client 500 acquires the refreshed parent token, then in step S5.7, the approval server cooperating client 500 reregisters the received information about the approval token ID and the refresh token ID in the parent token management table. Then, in step S5.8, the approval server cooperating client 500 transmits a child token acquisition request to the approval server 200 using the approval token ID of the parent token, the client ID and the client secret of the device management table 1600, the scope included in the received token acquisition request, and the acquired application ID. In this case, the application ID to be included in the child token acquisition request cannot be falsified by the resource service cooperating application 400, as described below.

If the approval server 200 receives the child token acquisition request, the approval server 200 performs the following processing. First, the approval server 200 verifies whether a pair of client ID and client secret included in the child token acquisition request coincides with any combination of the user ID 1201 and the password 1202 in the user management table 1200.

If coincidence between the compared information is confirmed in the verification, the approval server 200 confirms whether the approval token ID included in the child token acquisition request is already registered in the approval token management table 1400 and within the term of validity. Further, the approval server 200 verifies whether the client ID included in the child token acquisition request coincides with the client ID 1407. If coincidence between the compared information is confirmed in all of the above-mentioned verifications, then in step S5.9, the approval server 200 generates a child token. Further, in step S5.10, the approval server 200 responds to the approval server cooperating client 500 with the generated child token.

The approval server 200 issues a new approval token ID for the generated child token. As information to be registered in the approval token management table 1400, the child token is registered in the token type 1402. The acquired application ID is registered in the application ID 1409. The scope included in the child token acquisition request is registered in the scope 1404. In this case, the client ID 1407 and the user ID 1408 of a record identified by the approval token ID included in the received child token acquisition request are directly registered.

As a result, the child token issued in this case is associated with the user ID required to identify the user, the client ID required to identify the image forming apparatus, and the application ID required to identify the application. No refresh token is issued for the child token to eliminate any security risk. For example, the term of validity of a token can be freely updated when each application leaks the refresh token. Each application that uses the child token cannot issue the refresh request because the client ID and the client secret are necessary to issue the token refresh request.

Then, if the approval server cooperating client 500 acquires the approval token ID of the child token, the approval server cooperating client 500 responds to the resource service cooperating application 400 (i.e., the request source) with the approval token ID of the child token. If the resource service cooperating application 400 acquires the approval token ID of the child token, then in step S5.11, the resource service cooperating application 400 transmits a resource request including the approval token ID to the resource server 210. If the resource server 210 receives the resource request, then in step S5.12, the resource server 210 requests the approval server 200 to perform token verification for the approval token ID of the child token included in the request. The token verification request can include the scope.

If the approval server 200 receives the token verification request, then in step S5.13, the approval server 200 verifies whether the received approval token ID is already registered in the approval token management table 1400 and within the term of validity. Further, the approval server 200 verifies whether the received scope is within the range of the scope 1404. Next, in step S5.14, the approval server 200 responds to the resource server 210 with a verification result. Further, in step S5.15, the resource server 210 requests the approval server 200 to acquire token information about the approval token ID of the child token.

If the approval server 200 receives the token information acquisition request, then in step S5.16, the approval server 200 acquires information identified by the received approval token ID from the approval token management table 1400 and responds to the resource server 210 with the acquired information. The response to be transmitted in this case includes, for example, information about the scope 1404, the client ID 1407, the user ID 1408, and the application ID 1409. The response can further include information about the serial number 1304 registered in the client management table 1300, which can be identified by the client ID 1407.

If the resource server 210 acquires the token information, the resource server 210 determines whether to permit or deny an access to a requested target resource based on the acquired information. In the present exemplary embodiment, it is presumed that information about accessible application ID is set beforehand in the resource server 210. Therefore, in step S5.17, the resource server 210 verifies whether to permit the access based on a comparison between the application ID acquired from the token information and each application ID having been set beforehand. If it is determined that the access is permissible as a result of the verification, then in step S5.18, the resource server 210 responds to the resource service cooperating application 400 with the requested resource.

The resource to be transmitted in this case is, for example, a list of printable documents when the resource server 210 is a printing service or a list of creatable business forms when the resource server 210 is a business form service. Further, the resource to be transmitted is a list of transmittable FAX documents and FAX transmission destinations when the resource server 210 is a FAX service or a list of storage destinations of scanned documents when the resource server 210 is a scanning service.

In the above-described processing in step S5.12 to step S5.17, each of the approval server 200 and the resource server 210 performs token verification processing. Alternatively, it is useful that the approval server 200 manages applications accessible to the resource and the approval server 200 performs every verification processing.

Further, in the present exemplary embodiment, information to be used in determining an accessible application is the application ID. However, it is useful to identify the image forming apparatus 300 based on the serial number or the client ID that is acquirable from the token information and determine the accessibility based on the acquired information. Similarly, it is useful to determine the accessibility based on the scope or the user ID that is acquirable from the token information.

According to the first exemplary embodiment, it is feasible to improve the convenience because the approval operation to be performed to issue a child token is only one time. Namely, independently performing the approval operation for each of a plurality of applications in the same image forming apparatus is unnecessary. Further, it becomes feasible to identify an application of an access source at a cloud service without being falsified.

Further, registering batch processing to the image forming apparatus 300 as described in the first exemplary embodiment is effective to improve the convenience, because it is feasible to execute the batch processing without requiring any login operation by a user while preventing an incorrect resource access of the resource service cooperating application 400. Further, the cloud service side can safely permit the resource access while preventing the access source application from faking.

Further, the batch execution to be performed by the resource service cooperating application 400 has been described in the first exemplary embodiment. If a user of the image forming processing apparatus 300 performs settings beforehand for the batch processing, adequately switching between the batch processing and the user-login based execution for the resource service cooperating application 400 becomes feasible. Thus, the convenience can be improved.

Other Exemplary Embodiment

The first exemplary embodiment has been described on the presumption that the issuance of a parent token is requisite. However, it is also useful that the approval server cooperating client 500 manages the parent token for each user beforehand. In this case, the parent token is immediately available at the time when the approval server cooperating client 500 is installed on the image forming apparatus 300. Thus, simplifying the child token issuance processing is feasible, although it is not effective to suppress the increase in the number of users who use the image forming apparatus 300.

In the first exemplary embodiment, the image processing service (e.g., the business form service or the printing service) has been described as an example of the resource service. However, the resource service can be any other service, such as a game application or a music content distribution service. Further, the image forming apparatus has been described as an example of the device apparatus (i.e., the terminal). However, the device apparatus is not limited to the above-mentioned example and can be any other device apparatus, such as a smartphone or a music device. Further, the business form application or the print application has been described as an example of the resource service cooperating application. However, the resource service cooperating application is not limited to the above-mentioned example and can be any other application (e.g., application management software or music application). As mentioned above, the described embodiment(s) is not limited to specific entities. Further, the number of resource services is not limited to two or more. In some cases, it may be useful to use only one resource service.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

After user authority is delegated to an application, if the application uses a cloud service in a state where a user does not log in a device, the application can identify an authority to be used.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-250186 filed Nov. 14, 2012, which is hereby incorporated by reference herein in its entirety.

What is claimed is:

1. A image forming apparatus that communicates via a network with a server system that provides a print service to an external apparatus and an approval server system and installs a print application that uses the print service, the image forming apparatus comprising:
    a first acquisition unit configured to acquire first authority information to be issued by the approval server system in response to an approval operation that permits delegating user authority required to use the print service to the image forming apparatus;
    a receiving unit configured to receive identification information required to identify a user who uses the print service from the print application that starts batch processing at a predetermined time having been beforehand;
    an identifying unit configured to identify the first authority information based on the received identification information; and
    a second acquisition unit configured to transmit a request to delegate authority, if the request is delegated from the user, to the print application, together with the identified first authority information, to the approval server system and acquire second authority information, which has been issued based on the first authority information, from the approval server system
    wherein the second acquisition unit is configured to acquire an application ID of the print application, transmit the request to delegate the authority delegated from the user to the print application, together with the first authority information and the application ID, to the approval server system, and acquire the second authority information managed in association with the application ID from the approval server system, and
    wherein the print application is configured to acquire the second authority information from the second acquisition unit and receive the print service based on the acquired second authority information.

2. The image forming apparatus according to claim 1, wherein the first acquisition unit is configured to acquire the first authority information when the user has requested batch settings.

3. The image forming apparatus according to claim 1, wherein the second acquisition unit is configured to acquire the second authority information from the approval server system without accepting any approval operation from the user.

4. The image forming apparatus according to claim 1, wherein when the request source acquires the second authority information from the second acquisition unit and receives the service based on the acquired second authority information, the request source application receives the service if the application ID managed in association with the second authority information transmitted from the application is set beforehand in the server system.

5. The image forming apparatus according to claim 1, further comprising: a framework configured to manage a life cycle of an application that operates in an application execution environment provided by a virtual machine, wherein the framework is configured to manage the application ID of the application when installation is performed after confirming that the application is not falsified, and the second acquisition unit is configured to acquire the application ID via the framework.

6. The image forming apparatus according to claim 1, wherein the server system is a server system that provides at least one of a printing service and a business form service as an image processing service, and the device apparatus is an image forming apparatus that includes at least one of a printing unit and a scanner unit as an image processing unit.

7. The image forming apparatus according to claim 1, wherein the image forming apparatus is a smartphone.

8. A method for controlling a image forming apparatus that communicates via a network with a server system that provides a print service to an external apparatus and an approval server system, and installs a print application that uses the print service, the method comprising:
    acquiring first authority information to be issued by the approval server system in response to an approval operation that permits delegating user authority required to use the service to the device apparatus;
    receiving identification information required to identify a user who uses the service from the application that starts batch processing at a predetermined time having been set beforehand;
    identifying the first authority information based on the received identification information;
    transmitting a request to delegate authority, if the request is delegated from the user, to the application, together with the identified first authority information, to the approval server system and acquiring second authority information, which has been issued based on the first authority information, from the approval server system;
    acquiring an application ID of the print application, transmit the request to delegate the authority delegated from the user to the print application, together with the first authority information and the application ID, to the approval server system, and acquire the second authority information managed in association with the application ID from the approval server system; and
    acquiring the second authority information and receiving the print service based on the acquired second authority information.

9. A non-transitory computer-readable storage medium storing computer executable instructions that cause a computer to execute a control method for controlling an image forming apparatus that communicates via a network with a server system that provides a print service to an external apparatus and an approval server system, and installs a print application that uses the print service, the method comprising
    acquiring first authority information to be issued by the approval server system in response to an approval operation that permits delegating user authority required to use the service to the device apparatus;
    receiving identification information required to identify a user who uses the service from the application that starts batch processing at a predetermined time having been set beforehand;
    identifying the first authority information based on the received identification information;

transmitting a request to delegate authority, if the request is delegated from the user, to the application, together with the identified first authority information, to the approval server system and acquiring second authority information, which has been issued based on the first authority information, from the approval server system;

acquiring an application ID of the print application, transmit the request to delegate the authority delegated from the user to the print application, together with the first authority information and the application ID, to the approval server system, and acquire the second authority information managed in association with the application ID from the approval server system; and acquiring the second authority information and receiving the print service based on the acquired second authority information.

* * * * *